(12) United States Patent
Kanbara et al.

(10) Patent No.: US 10,958,207 B2
(45) Date of Patent: Mar. 23, 2021

(54) ATTACHMENT STRUCTURE OF PHOTOVOLTAIC CELL MODULE

(71) Applicant: SOLAR FRONTIER K.K., Tokyo (JP)

(72) Inventors: Tatsuji Kanbara, Tokyo (JP); Shinji Kato, Tokyo (JP); Toshiaki Yamaura, Tokyo (JP); Natsuki Hamada, Tokyo (JP); Tetsuji Itou, Tokyo (JP); Bagwadkar Ninad, Tochigi (JP); Tomoyasu Yamada, Tokyo (JP); Mitsuru Arasaki, Tokyo (JP); Hideki Sakai, Tokyo (JP); Mitsuru Onoda, Tokyo (JP); Yuuki Narita, Tokyo (JP)

(73) Assignee: Solar Frontier K.K., Tokyo (JP)

( * ) Notice: Subject to any disclaimer, the term of this patent is extended or adjusted under 35 U.S.C. 154(b) by 0 days.

(21) Appl. No.: 15/029,313

(22) PCT Filed: Oct. 17, 2014

(86) PCT No.: PCT/JP2014/077678
§ 371 (c)(1),
(2) Date: Apr. 14, 2016

(87) PCT Pub. No.: WO2015/056775
PCT Pub. Date: Apr. 23, 2015

(65) Prior Publication Data
US 2016/0261228 A1    Sep. 8, 2016

(30) Foreign Application Priority Data

Oct. 18, 2013 (JP) .............................. JP2013-217666

(51) Int. Cl.
*H02S 30/10* (2014.01)
*H02S 40/34* (2014.01)
(Continued)

(52) U.S. Cl.
CPC .............. *H02S 30/10* (2014.12); *F24S 25/10* (2018.05); *F24S 25/11* (2018.05); *F24S 25/16* (2018.05);
(Continued)

(58) Field of Classification Search
CPC .......... H02S 20/10; H02S 20/20; H02S 20/22; H02S 20/23; H02S 20/24; H02S 30/10; H02S 20/25; Y02B 10/12
(Continued)

(56) References Cited

U.S. PATENT DOCUMENTS

| 5,746,839 A | * | 5/1998 | Dinwoodie | ............ F24J 2/5237 136/246 |
| 2009/0114262 A1 | * | 5/2009 | Adriani | ................ B23K 1/0008 136/244 |

(Continued)

FOREIGN PATENT DOCUMENTS

| JP | S62-233355 | 10/1987 |
| JP | 2004-278173 | 10/2004 |

(Continued)

OTHER PUBLICATIONS

International Search Report dated Dec. 16, 2014.
Japanese Office Action for 2015-542680 dated Apr. 16, 2019.
Japanese Office Action for 2015-542680 dated Oct. 9, 2018.

*Primary Examiner* — Shannon M Gardner
(74) *Attorney, Agent, or Firm* — IPUSA, PLLC

(57) ABSTRACT

In an attachment structure for attaching a photovoltaic cell module having flexibility to an installation surface or an attachment member, a back surface of the photovoltaic cell module is attached to the installation surface or the attachment member by being adhered by an adhesive material.

3 Claims, 21 Drawing Sheets

(51) Int. Cl.
- *H02S 40/42* (2014.01)
- *H02S 20/23* (2014.01)
- *H02S 20/24* (2014.01)
- *H02S 40/36* (2014.01)
- *H02S 20/10* (2014.01)
- *H02S 30/00* (2014.01)
- *F24S 25/16* (2018.01)
- *F24S 25/10* (2018.01)
- *F24S 25/35* (2018.01)
- *F24S 25/33* (2018.01)
- *F24S 25/61* (2018.01)
- *F24S 25/11* (2018.01)
- *F24S 25/60* (2018.01)

(52) U.S. Cl.
CPC .............. *F24S 25/33* (2018.05); *F24S 25/35* (2018.05); *F24S 25/61* (2018.05); *H02S 20/10* (2014.12); *H02S 20/23* (2014.12); *H02S 20/24* (2014.12); *H02S 30/00* (2013.01); *H02S 40/34* (2014.12); *H02S 40/36* (2014.12); *H02S 40/42* (2014.12); *H02S 40/425* (2014.12); *F24S 2025/601* (2018.05); *Y02B 10/10* (2013.01); *Y02E 10/47* (2013.01); *Y02E 10/50* (2013.01)

(58) Field of Classification Search
USPC .................................................. 136/243–265
See application file for complete search history.

(56) References Cited

U.S. PATENT DOCUMENTS

| | | | | |
|---|---|---|---|---|
| 2009/0283136 A1* | 11/2009 | Munch | .................... | F24J 2/5228 |
| | | | | 136/251 |
| 2010/0242381 A1* | 9/2010 | Jenkins | .................... | H02S 20/23 |
| | | | | 52/173.3 |
| 2011/0005581 A1* | 1/2011 | Kanbara | ................ | F24J 2/5232 |
| | | | | 136/251 |
| 2011/0146793 A1* | 6/2011 | Comert | .................... | B60J 1/007 |
| | | | | 136/259 |
| 2012/0085391 A1* | 4/2012 | Varde | ...................... | H02S 20/23 |
| | | | | 136/251 |

FOREIGN PATENT DOCUMENTS

| | | |
|---|---|---|
| JP | 2007-035976 | 2/2007 |
| JP | 2012-250468 | 12/2012 |
| JP | 2013-004694 | 1/2013 |

\* cited by examiner (a)

(b)

FIG.6
(a)
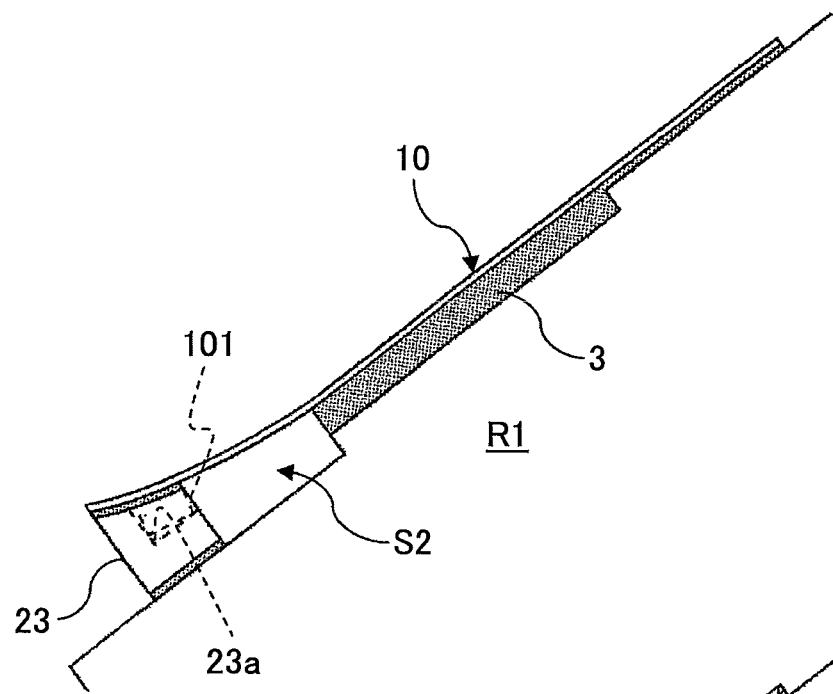
(b)
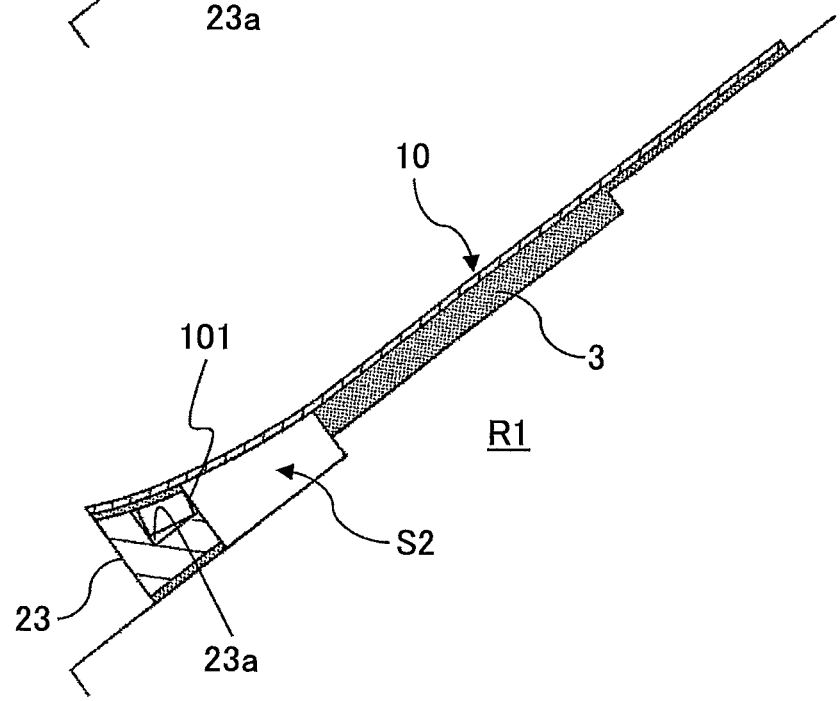

FIG.7
(a)
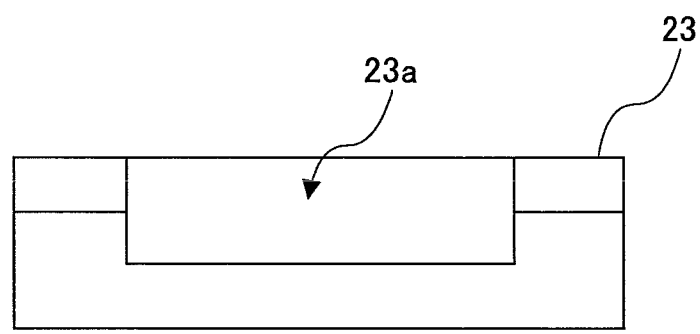
(b)
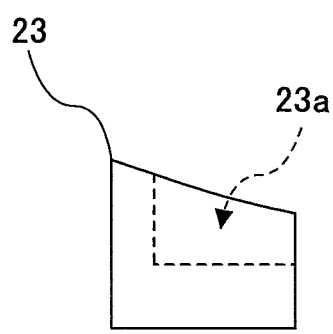

FIG.9
(a)
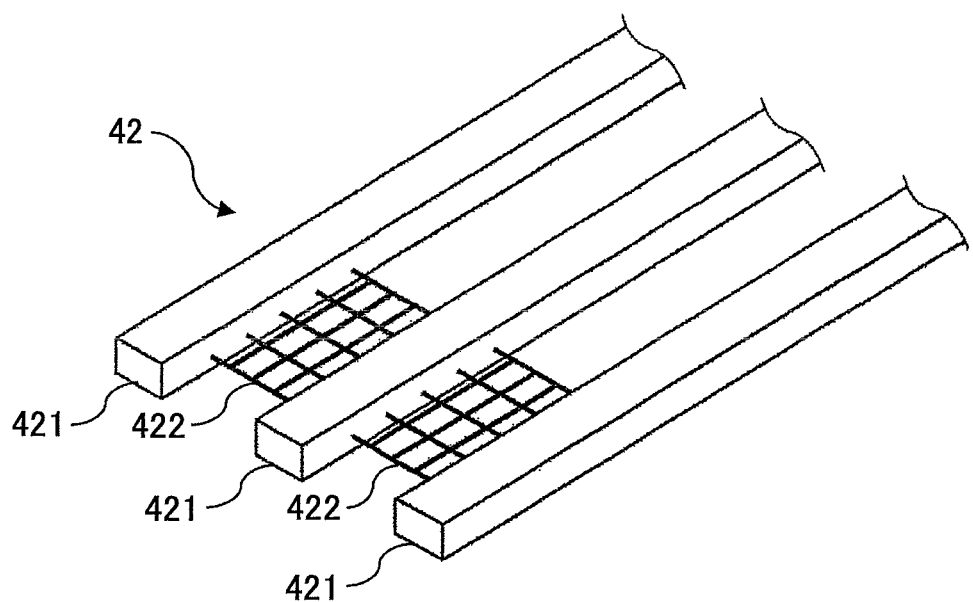
(b)
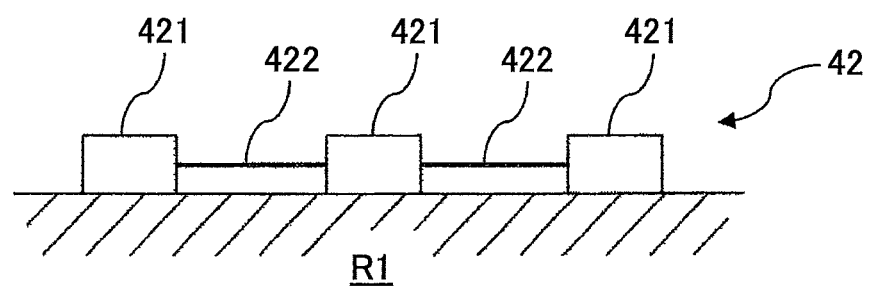

FIG.10
(a)
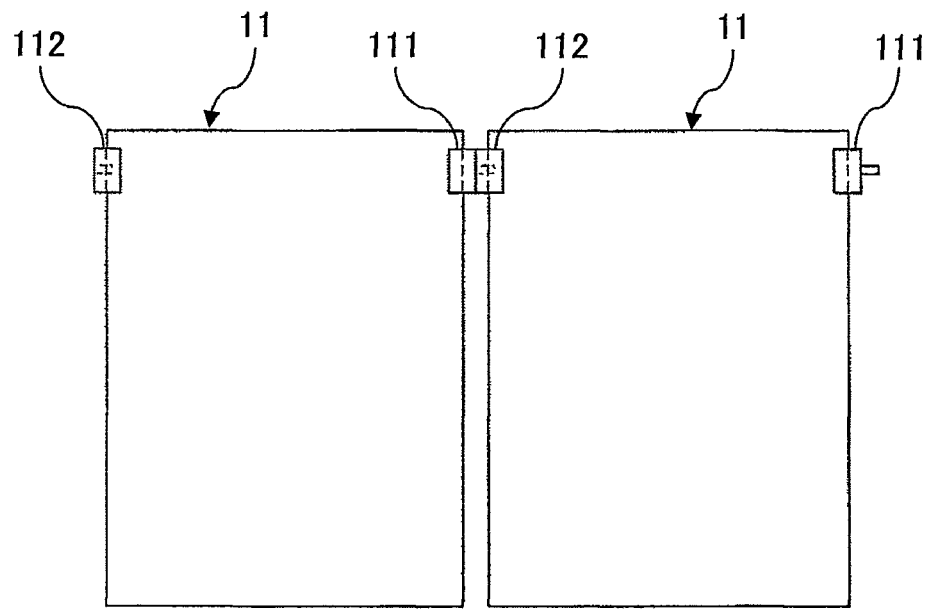
(b)
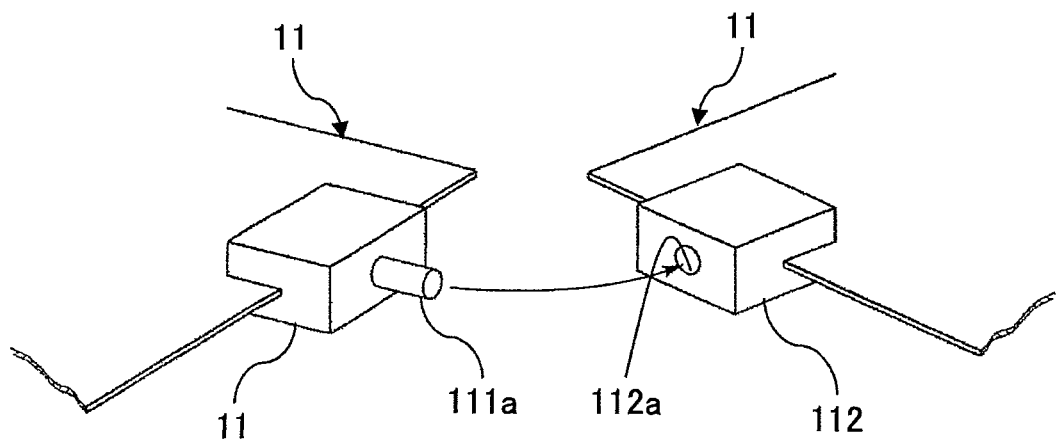

FIG.11
(a)
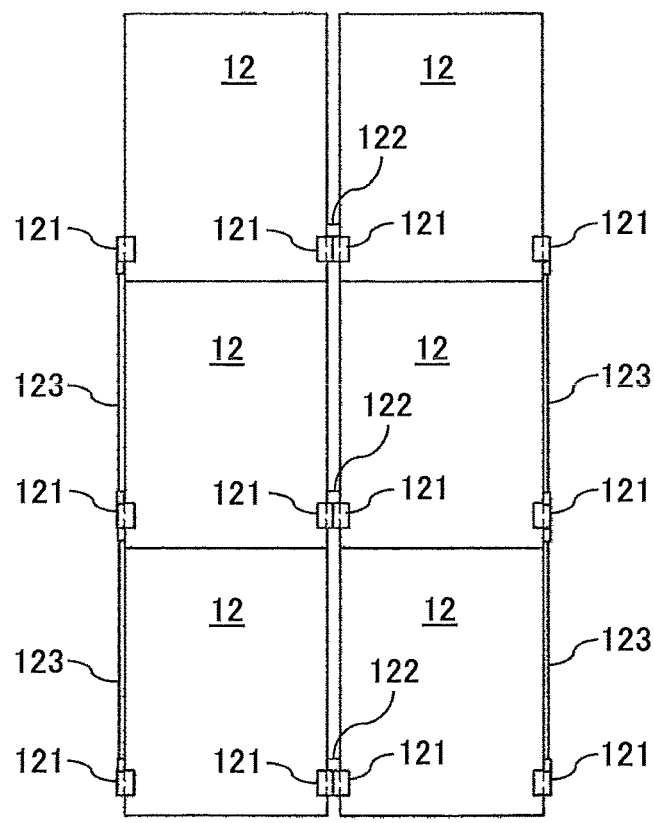
(b)
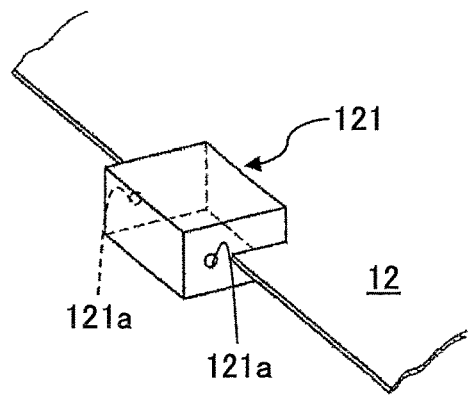
(c)
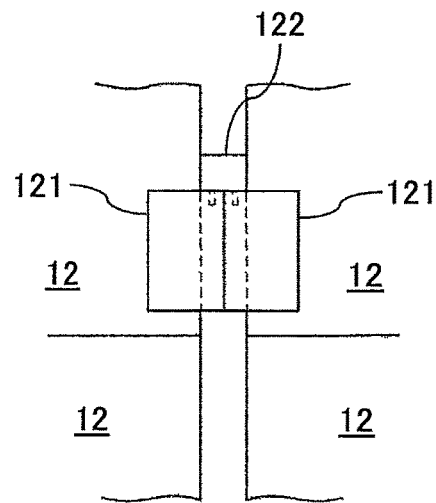
(d)
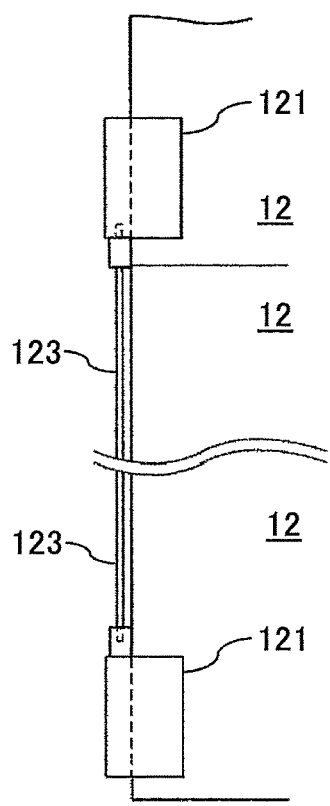

ATTACHMENT STRUCTURE OF PHOTOVOLTAIC CELL MODULE

BACKGROUND OF THE INVENTION

1. Field of the Invention

The present invention relates to a structure for attaching a thin-film photovoltaic cell module having flexibility to a predetermined installation surface or an attachment member.

2. Description of the Related Art

Conventionally, as a thin-film photovoltaic cell module, a thin-film Si-based photovoltaic cell module in which microcrystal Si (Si: silicon) or amorphous Si is used as a light absorption layer, a compound thin-film photovoltaic cell module in which a compound semiconductor is used as a light absorption layer or the like is known.

Different from a crystal Si-based photovoltaic cell module, such a thin-film photovoltaic cell module has a structure in which a semiconductor thin-film is stacked on a substrate.

Further, although a general thin-film photovoltaic cell module is formed by stacking a semiconductor thin-film on a glass substrate, in addition to this, the thin-film photovoltaic cell module may be formed by stacking a semiconductor thin-film on a flexible substrate or a substrate having flexibility such as a metal substrate, a resin substrate or the like.

It is possible for the thin-film photovoltaic cell module using the flexible substrate as described above to have flexibility itself. Such a flexible thin-film photovoltaic cell module has features such as applicable to various installation surfaces and hardly damaged due to flexibility of the substrate even when load such as deposited snow or the like is applied, compared with a general thin-film photovoltaic cell module using a glass substrate, and has availability different from the general thin-film photovoltaic cell module using the glass substrate.

However, there is a problem that it is difficult to attach the thin-film photovoltaic cell module having flexibility to a roof of a ridge or on a mounting because its rigidity is small due to its flexibility.

SUMMARY OF THE INVENTION

The present invention is made in light of the above problems, and provides an attachment structure that is suitable for attaching a thin-film photovoltaic cell module having flexibility to various installation surfaces and attachment members which are fixed to the installation surfaces and that is easily and surely capable of attaching.

According to an embodiment, there is provided an attachment structure for attaching a thin-film photovoltaic cell module having flexibility to a predetermined installation surface or an attachment member, wherein a back surface of the thin-film photovoltaic cell module is attached to the installation surface or the attachment member by being adhered by an adhesive material.

Further, the adhesive agent may be a foaming adhesive agent.

Further, a spacer may be inserted between the thin-film photovoltaic cell module and the installation surface or the attachment member for forming a gap at least at a part between the thin-film photovoltaic cell module and the installation surface or the attachment member.

Further, a terminal box for extracting generated electric power may be attached at a back surface of the thin-film photovoltaic cell module, the spacer may be provided with a concave portion to which the terminal box is fitted, and the terminal box may be fitted in the concave portion of the spacer.

According to the embodiment, it is possible to easily and surely attach a thin-film photovoltaic cell module having flexibility to various installation surfaces and attachment members that are fixed to the installation surfaces.

BRIEF DESCRIPTION OF THE DRAWINGS

FIG. 6 is a view illustrating an example of the attachment structure of a thin-film photovoltaic cell module of the embodiment, wherein (a) is a side view and (b) is a cross-sectional view;

FIG. 7 is a view illustrating a spacer used in the attachment structure of the thin-film photovoltaic cell module of the embodiment, wherein (a) is a plan view and (b) is a side view;

FIG. 9 is a view illustrating a mounting used in the attachment structure of the thin-film photovoltaic cell module of the embodiment, wherein (a) is a perspective view and (b) is an elevation view;

FIG. 10 is a view illustrating an example of a connection structure of the thin-film photovoltaic cell modules in the attachment structure of the thin-film photovoltaic cell module of the embodiment, wherein (a) is a plan view and (b) is a perspective view illustrating a connection structure of connectors;

FIG. 11 is a view illustrating an example of the connection structure of the thin-film photovoltaic cell modules in the attachment structure of the thin-film photovoltaic cell module of the embodiment, wherein (a) is a plan view, (b) is a perspective view illustrating a shape of a terminal box of the thin-film photovoltaic cell module, (c) is a plan view illustrating a connection structure of connectors and (d) is a plan view illustrating the connection structure of the connectors;

DETAILED DESCRIPTION OF THE PREFERRED EMBODIMENTS

An attachment structure of a thin-film photovoltaic cell module of the embodiment is a structure for attaching a thin-film photovoltaic cell module having flexibility to an installation surface such as a roof or the like.

Figure 1:
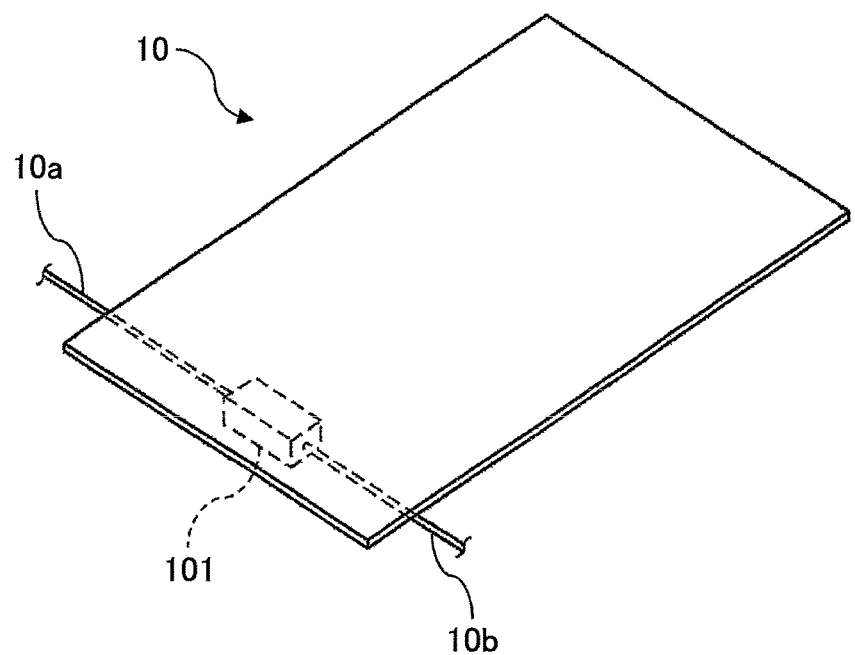
FIG. 1 is a perspective view illustrating a thin-film photovoltaic cell module to which an attachment structure of a thin-film photovoltaic cell module of an embodiment is applied.

FIG. 1 illustrates an example of a thin-film photovoltaic cell module to which the attachment structure of the thin-film photovoltaic cell module of the embodiment is applied.

A thin-film photovoltaic cell module 10 is a photovoltaic cell module in which a semiconductor thin-film is stacked such as a thin-film Si-based photovoltaic cell module in which microcrystal Si (Si: silicon) or amorphous Si is used as a light absorption layer, a compound thin-film photovoltaic cell module in which a compound semiconductor is used as a light absorption layer or the like.

The thin-film photovoltaic cell module 10 is formed by stacking a semiconductor thin-film on a substrate that has flexibility and that is composed of a thin-plate metal or resin. As the substrate has flexibility, the module itself also has flexibility.

Lead wires are attached to electrodes provided at the semiconductor thin-film of the thin-film photovoltaic cell module 10 for outputting electric power generated by receiving light to outside, and the lead wires are once aggregated in a terminal box 101 that is attached at a back surface side of the thin-film photovoltaic cell module 10. Further, positive and negative output cables 10a and 10b that are electrically connected to the lead wires are led out from the terminal box 101.

The thin-film photovoltaic cell module 10 of the example has a rectangular shape, and the terminal box 101 is attached at one end side of the back surface side of the thin-film photovoltaic cell module 10 in a longitudinal direction in a biased manner.

Further, it is easier to be attached to an installation surface when the terminal box 101 has an elongate and thin shape, and in such a case, the height of a spacer, which will be explained later, can be reduced.

Further, the output cable 10a that is connected to one of positive and negative terminals is led out from one side end portion of the terminal box 101 of the example, and the output cable 10b that is connected to the other of the positive and negative terminals is led out from another side end portion of the terminal box 101 that is opposite from the one side end portion. With this configuration, when connecting adjacent thin-film photovoltaic cell modules 10, it is easy to lay out the output cables 10a and 10b. Further, regardless of these descriptions, examples which will be explained below are applicable to a thin-film photovoltaic cell module to which a terminal box in which a pair of output cables connected to positive and negative terminals, respectively, are led out from one side end portion is attached, as the thin-film photovoltaic cell module 10.

Figure 2:
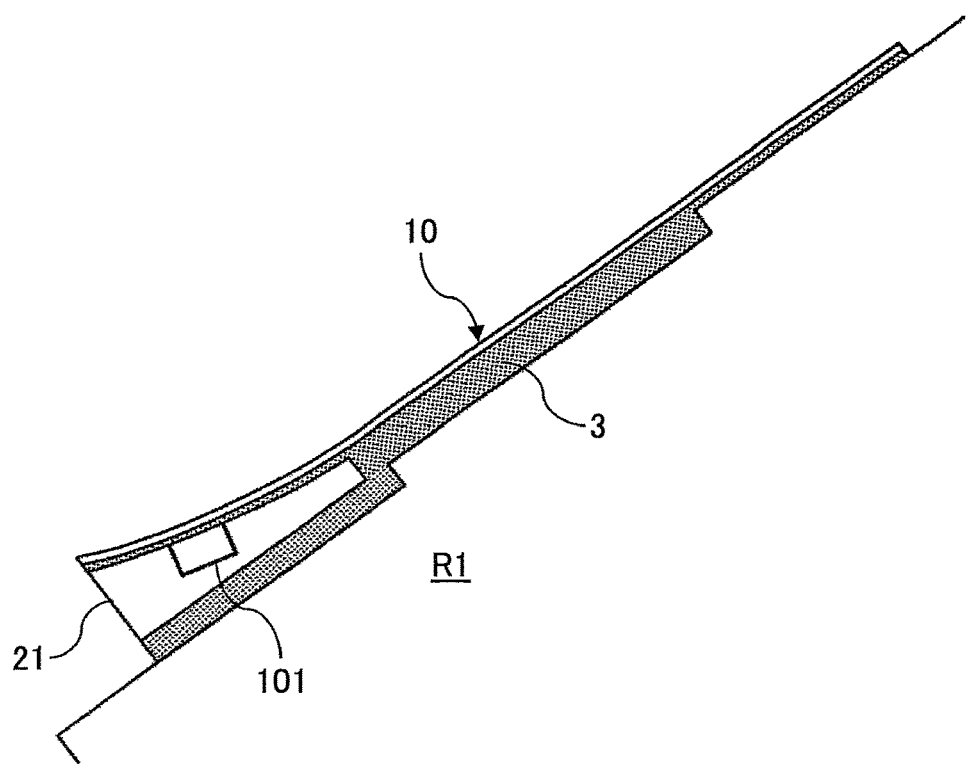
FIG. 2 is a side view illustrating an example of the attachment structure of the thin-film photovoltaic cell module of the embodiment.

FIG. 2 illustrates an example of an attachment structure in which the thin-film photovoltaic cell module 10 is installed on an installation surface R1, assuming a roof that is tilted from a ridge side to an eaves side as the installation surface R1.

The thin-film photovoltaic cell module 10 is installed such that its longitudinal direction is in parallel to a tilting direction of the installation surface R1 as well as the terminal box 101 at the back surface side is positioned at the eaves side. The thin-film photovoltaic cell module 10 is directly adhered to the installation surface R1 by an adhesive agent 3 except a part of the eaves side at which the terminal box 101 is provided at the back surface side.

Here, for the adhesive agent 3 that adheres the thin-film photovoltaic cell module 10 and the installation surface R1, a foaming adhesive agent or the like such as polyurethane foam or the like is used, for example.

By using the adhesive agent 3 to adhere the thin-film photovoltaic cell module 10 and the installation surface R1, it is possible to finely adjusting an attachment position of the thin-film photovoltaic cell module 10 until the adhesive agent 3 is cured and thereby execution can be simplified. Further, as it is possible to install the thin-film photovoltaic cell module 10 regardless of a position of a rafter of the roof, the installation surface R1, this technique can applicable to various roofs. Further, by installing by the adhesive agent 3, a specific tool such as a wrench or the like for fixing a metal fitting, which is conventionally necessary, is not necessary.

Further, by using the adhesive agent 3 for attachment, when installing the thin-film photovoltaic cell modules 10 on the roof, the installation surface R1, the thin-film photovoltaic cell modules 10 can be installed from the ridge side toward the eaves side of the roof, and thereby safety of execution can be improved. In other words, when installing the thin-film photovoltaic cell modules 10 on the roof, the installation surface R1, in the construction using a general mounting, the thin-film photovoltaic cell modules 10 are installed from the eaves side toward the ridge side of the tilted roof. Thus, there is a dangerous case because an operator needs to work while standing at the ridge side with respect to the installing thin-film photovoltaic cell module 10 and leaning forward toward the eaves side. However, it is unnecessary to stand at the ridge side and safety is improved.

Further, as the thin-film photovoltaic cell module 10 is directly adhered to the installation surface R1 by the adhesive agent 3, weight of the mounting or the like is not applied on the installation surface R1, and even when snow covers the thin-film photovoltaic cell module 10, the installation surface R1 supports the load due to the deposited snow and load capability can be improved.

Further, in the attachment by the adhesive agent 3, as it is unnecessary to form holes for a screw or a small screw at the roof, the installation surface R1, for fixing the thin-film photovoltaic cell module 10, risk such as rain leaking or the like can be prevented.

Further, by using the foaming adhesive agent as the adhesive agent 3, it is possible to follow a shape of the installation surface R1, in particular, a concavo-convex shape at a surface such as distortion or deformation, and with this, a gap generated due to such a concavo-convex shape of the installation surface R1 can be filled by the adhesive agent 3 and adhesion properties can be improved. In addition, as the thin-film photovoltaic cell module 10 itself has flexibility, it becomes easy to follow unevenness of the installation surface R1, and it is unnecessary to adjust unevenness, in other words, adjust the height of a mounting in accordance with the unevenness of the installation surface R1, that is conventionally necessary, and it is possible to install the thin-film photovoltaic cell module 10 on a curved surface.

Further, even after installing the thin-film photovoltaic cell module 10, the thin-film photovoltaic cell module 10 can be easily detached from the installation surface R1 by cutting the adhesive agent 3 which is made of the solidified foaming adhesive agent by a wire, or by melting the adhesive agent 3 by coating organic solvent such as acetone.

Further, it is possible to fix the output cables 10a and 10b of the thin-film photovoltaic cell module 10 by the adhesive agent 3.

Further, different from a silicone based adhesive agent, it is possible for the foaming adhesive agent to re-adhere after once removing it, and it is easy to replace the thin-film photovoltaic cell module 10. Further, as the foaming adhesive agent does not corrode by a salt damage, it is possible to install the thin-film photovoltaic cell module 10 at a region where salt damage occurs.

When attaching the thin-film photovoltaic cell module 10 to the installation surface R1, the eaves side of the back surface at which the terminal box 101 of the thin-film photovoltaic cell module 10 is attached is attached by the adhesive agent 3 while a spacer 21 is interposed between the thin-film photovoltaic cell module 10 and the installation surface R1.

Figure 3:
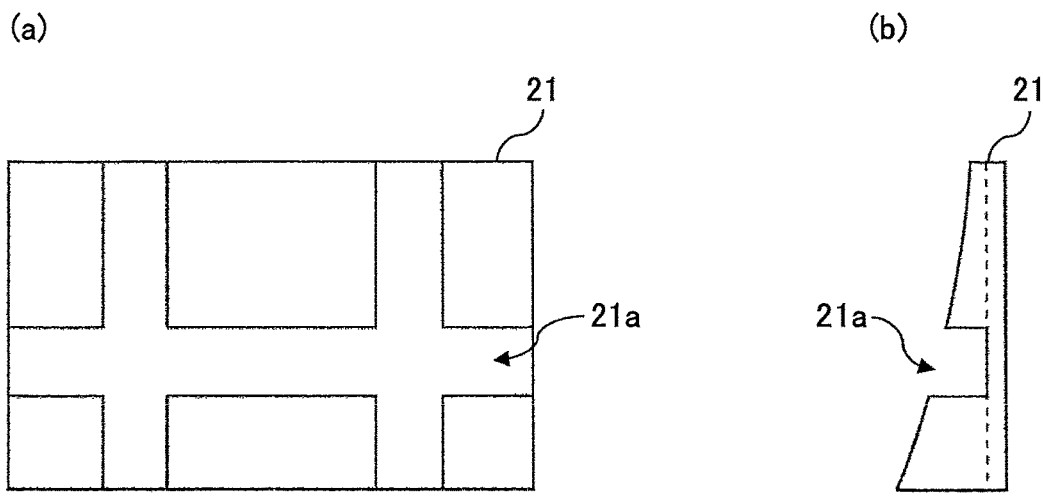
FIG. 3 is a view illustrating a spacer used in the attachment structure of the thin-film photovoltaic cell module of the embodiment, wherein (a) is a plan view and (b) is a side view.

As illustrated in FIG. 3, the spacer 21 has a wedge shape of a substantially triangle pole with a bottom surface having a substantially right triangle, preferably made of light resin such as foaming resin or the like, but may be made of other resins or metal.

The spacer 21 has a curved surface with a gradually arising curve at an upper surface side to which the thin-film photovoltaic cell module 10 is adhered so that the adhered thin-film photovoltaic cell module 10 is not bent. However, instead of forming the upper surface of the spacer 21 as the curved surface, a flat surface without a curve may be formed.

Further, the spacer 21 is provided with a grooved concave portion 21a at the upper surface side for laying out the output cables 10a and 10b of the thin-film photovoltaic cell module 10 or fitting the terminal box 101 in. The concave portion 21a at least has a space in which the terminal box 101 is fitted, and side end portions of the concave portion 21a is open so that the output cables 10a and 10b can be led out to outside.

When attaching the thin-film photovoltaic cell module 10 to the installation surface R1 by the adhesive agent 3, the spacer 21 is interposed at the eaves side of the back surface at which the terminal box 101 of the thin-film photovoltaic cell module 10 is attached, and the terminal box 101 and the output cables 10a and 10b are housed in the concave portion 21a of the spacer 21.

Then, the adhesive agent 3 is coated between the spacer 21 and the installation surface R1, and between the spacer 21 and the thin-film photovoltaic cell module 10. In accordance with necessity, the adhesive agent 3 is filled in the concave portion 21a in which the terminal box 101 and the output cables 10a and 10b are housed.

As such, for the thin-film photovoltaic cell module 10 adhered to the installation surface R1 by the adhesive agent 3 via the spacer 21, the terminal box 101 and the output cables 10a and 10b are housed in the concave portion 21a of the spacer 21. With this, a trouble such as the terminal box 101 and the output cables 10a and 10b are directly influenced by the heat or oscillation of the installation surface R1, or the trouble such as the terminal box 101 and the output cables 10a and 10b are soaked in rain water or the like flowing through the installation surface R1 by being in contact with the installation surface R1 can be prevented.

Figure 4:
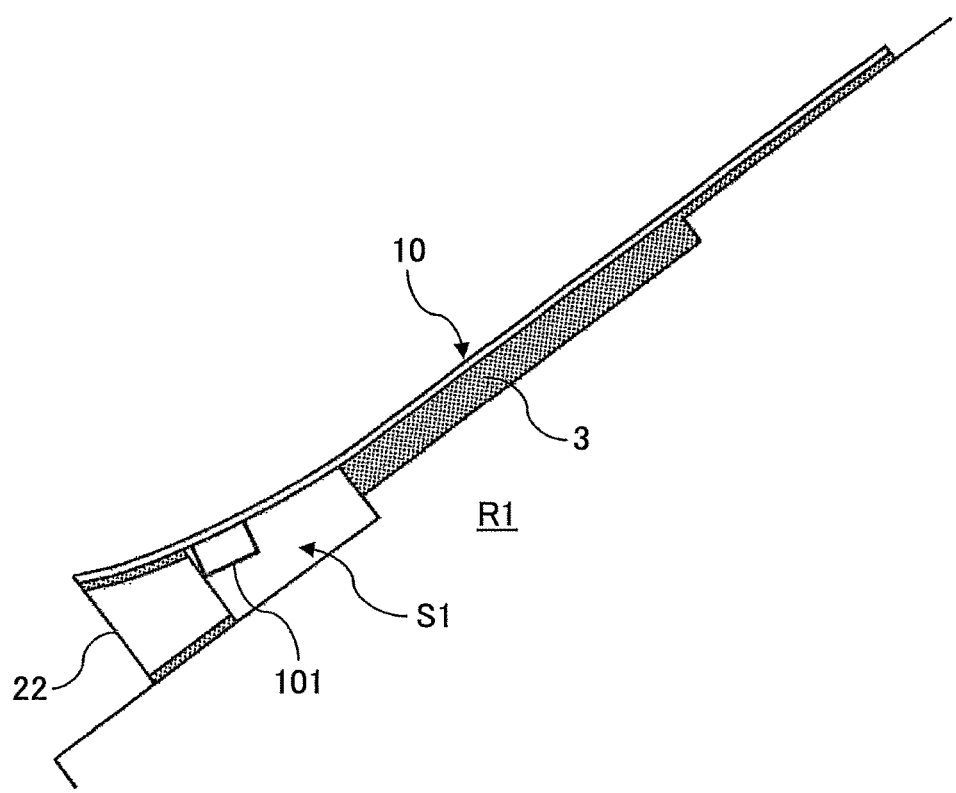
FIG. 4 is a side view illustrating an example of the attachment structure of the thin-film photovoltaic cell module of the embodiment.

FIG. 4 illustrates the attachment structure of the thin-film photovoltaic cell module 10 by a spacer 22 that is an alternative example of the spacer 21.

Similar to the spacer 21, the spacer 22 is interposed between the eaves side of the thin-film photovoltaic cell module 10 and the installation surface R1, and the thin-film photovoltaic cell module 10 and the installation surface R1 are adhered by the adhesive agent 3.

Figure 5:
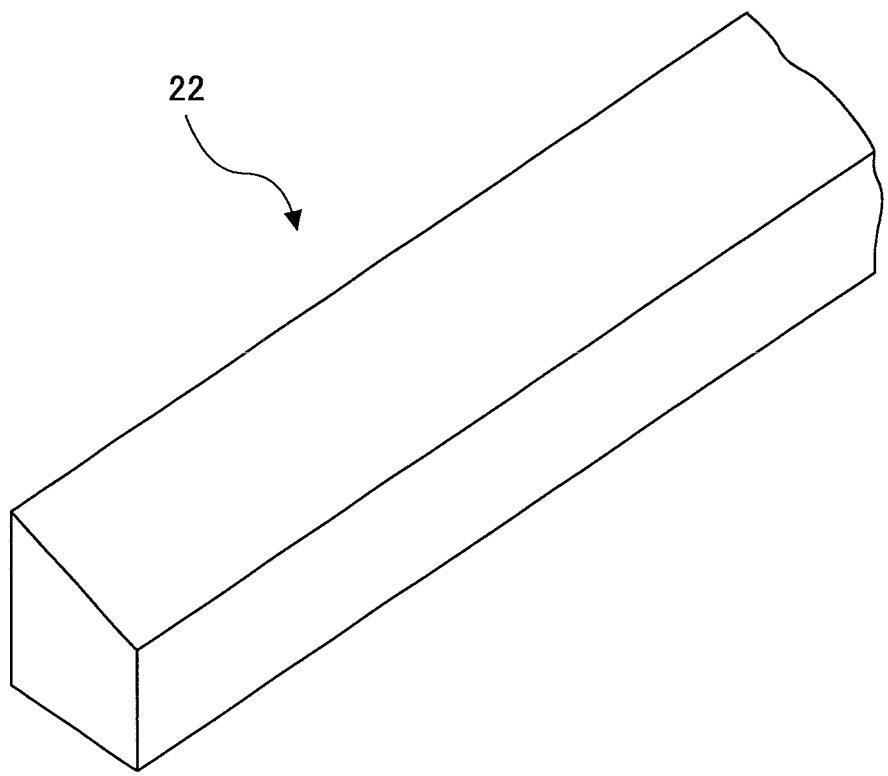
FIG. 5 is a perspective view illustrating a spacer used in the attachment structure of the thin-film photovoltaic cell module of the embodiment.

As illustrated in FIG. 5, the spacer 22 has a substantially trapezoid shape whose depth is shallower than the spacer 21 and the entirety has a predetermined height.

Similar to the spacer 21, the spacer 22 is preferably made of light resin such as foaming resin or the like, but may be made of other resins or metal.

Due to such a shape of the spacer 22, when the thin-film photovoltaic cell module 10 is attached to the installation surface R1 by the adhesive agent 3, a gap S1 is provided between the thin-film photovoltaic cell module 10 and the installation surface R1 at the ridge side of the spacer 22.

It is possible to house the terminal box 101 and the output cables 10a and 10b which are attached to the back surface side of the thin-film photovoltaic cell module 10 in the gap S1, and it is possible to lead out the output cables 10a and 10b from the gap S1 to outside.

FIG. 6 illustrates the attachment structure of the thin-film photovoltaic cell module 10 by a spacer 23 that is an alternative example of the spacer 21.

Similar to the spacer 21, the spacer 23 is interposed between the eaves side of the thin-film photovoltaic cell module 10 and the installation surface R1, and the thin-film photovoltaic cell module 10 and the installation surface R1 are adhered by the adhesive agent 3.

As illustrated in FIG. 7, similar to the spacer 22, the spacer 23 has a substantially trapezoid shape whose depth is shallower than the spacer 21 and the entirety has a predetermined height. Further, the spacer 23 is provided with a concave portion 23a near center at the upper surface side in which the terminal box 101 is capable of being fitted. The ridge side of the concave portion 23a is open so that the output cables 10a and 10b can be led out to outside.

Similar to the spacer 21, the spacer 23 is preferably made of light resin such as foaming resin or the like, but may be made of other resins or metal.

Due to such a shape of the spacer 23, when the thin-film photovoltaic cell module 10 is attached to the installation surface R1 by the adhesive agent 3, a gap S2 is provided between the thin-film photovoltaic cell module 10 and the installation surface R1 at the ridge side of the spacer 23.

It is possible to house the output cables 10a and 10b which are led out from the terminal box 101 that is fitted in the concave portion 23a in the gap S2, and it is possible to lead out the output cables 10a and 10b from the gap S2 to outside.

Next, an attachment structure is explained in which the thin-film photovoltaic cell module is attached to the installation surface via a predetermined attachment member.

Figure 8:
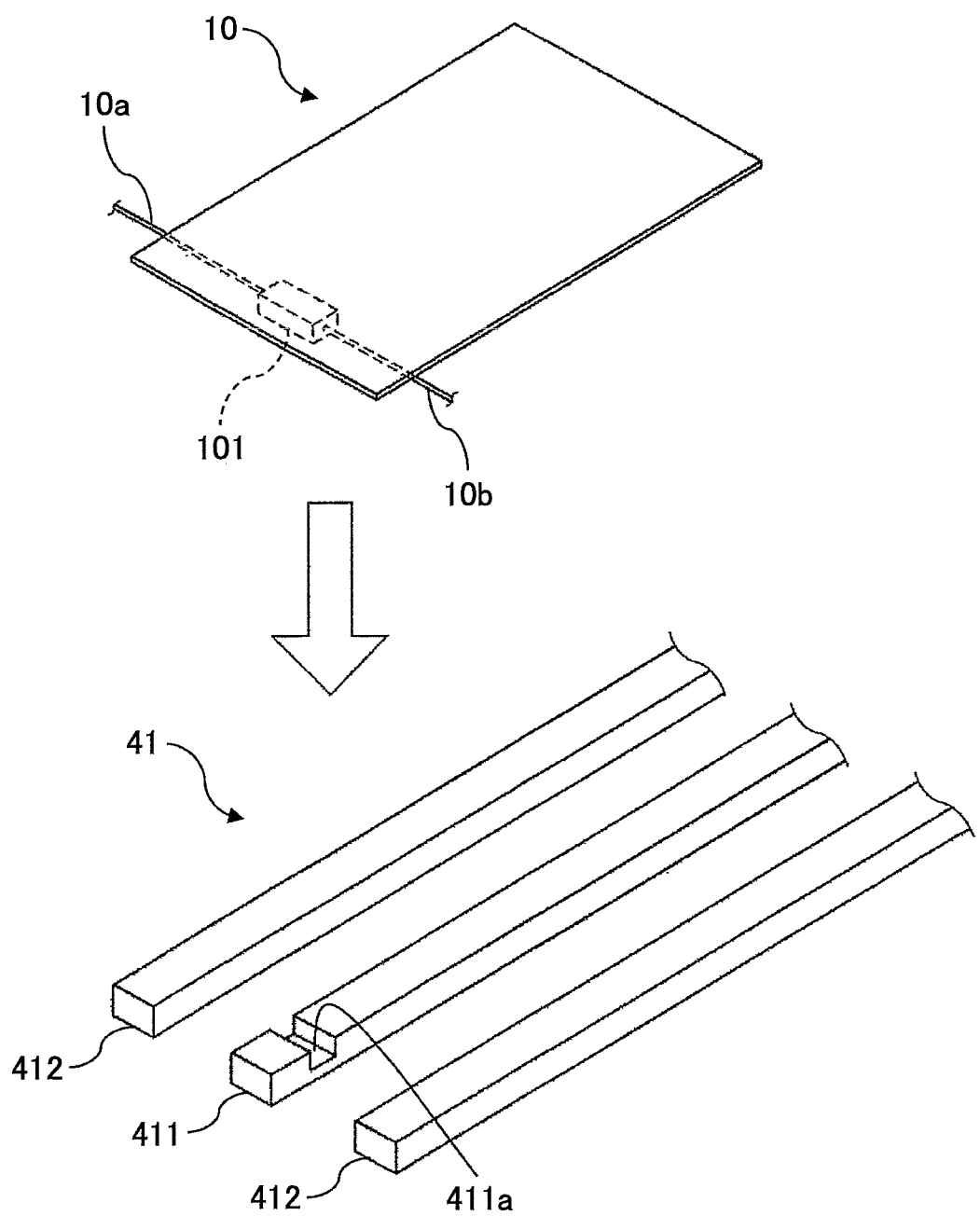
FIG. 8 is a perspective view illustrating an example of the attachment structure of the thin-film photovoltaic cell module of the embodiment.

FIG. 8 illustrates an example in which the thin-film photovoltaic cell module 10 is attached to the installation surface R1 via a mounting 41.

The mounting 41 is an attachment member for attaching the thin-film photovoltaic cell module 10 on the installation surface, is configured with vertical beams 411 and 412 and is adhered on the installation surface by an adhesive agent, and the thin-film photovoltaic cell module 10 is attached at its upper surface. When attaching the vertical beams 411 and 412 on the installation surface R1, the vertical beams 411 and 412 may be fixed by screws or the like instead of the adhesive agent. Further, the material of the mounting 41 may be metal, but it is preferable that the material is resin (foaming resin or the like) as it has durability against salt damage.

Each of the vertical beams 411 and 412 is a long rod member, and it is preferable that each of the vertical beams 411 and 412 is provided such that the longitudinal direction is in parallel to the tilting direction or the direction of water flows of the tilted installation surface.

By placing the vertical beams 411 and 412 with a constant pitch interval such that their longitudinal directions are in parallel to the direction of water flows, spaces are formed between the vertical beams 411 and 412, rain water or the like flows through the spaces and draining is facilitated.

Further, the vertical beam 411 is provided with a concave portion 411a near one end portion at downstream of water flows. The terminal box 101 of the thin-film photovoltaic cell module 10 can be fitted in the concave portion 411a.

As such, by providing the concave portion 411a in which the terminal box 101 can be fitted at the vertical beam 411, the concave portion 411a becomes a reference position when placing the thin-film photovoltaic cell module 10, and execution can be simplified.

Further, the mounting 41 may be further provided with a concave portion for passing through the output cables 10a and 10b, in addition to the concave portion 411a.

FIG. 9 illustrates a mounting 42 of an alternative example of the mounting 41.

Similar to the mounting 41, the mounting 42 is an attachment member for attaching the thin-film photovoltaic cell module 10 on the installation surface. The mounting 42 includes a plurality of vertical beams 421 which are long rod members, respectively, and tabular panels 422 hung over between the vertical beams 421 and is adhered on the installation surface by the adhesive agent, and the thin-film photovoltaic cell module 10 is attached on upper surfaces of the vertical beams 421. Further, when attaching the vertical beams 421 on the installation surface R1, the vertical beams 421 may be fixed by screws or the like instead of the adhesive agent. Further, the material of the mounting 42 may be metal, but it is preferable that the mounting 42 is made of resin (foaming resin or the like) as it has durability against salt damage.

Similar to the above described vertical beams 411 and 412, the plurality of vertical beams 421 are placed with a constant pitch interval such that their longitudinal directions are in parallel to the direction of water flows. With this, spaces are formed between the vertical beams 421, rain water or the like flows through the spaces and draining is facilitated.

Each of the panels 422 that are hung over the plurality of vertical beams 421 has a substantially half length of the length of the vertical beam 421, and has mesh-like gaps. The panel 422 may be configured by a wire mesh, a metal plate provided with dot-like holes or a flat plate made of resin provided with dot-like holes, for example.

Further, the panel 422 is provided between a pair of vertical beams 421 such that one end of the panel 422 is attached to a center portion of one of the vertical beams 421 in a width direction and the other end of the panel 422 is attached to a center portion of the other of the vertical beams 421 in a width direction. With this, the panel 422 is retained under a state that it is floated at a certain height from the installation surface.

Further, the panel 422 may be attached at downstream of water flows of the vertical beam 421 in a biased manner. As an alternative example for this, the panel 422 may be configured to be placed at the entire surface between the vertical beams 421.

The output cables 10a and 10b of the thin-film photovoltaic cell module 10 can be housed at the upper surface side of the panel 422, and appropriately fixed by a clip or the like by providing the panel 422. With this, the output cables 10a and 10b can be prevented from contacting the installation surface, and as a result, the output cables 10a and 10b can be prevented from being soaked in rain water or the like flowing on the installation surface. Meanwhile, the lower surface side of the panel 422 can be a drainage of the rain water or the like. Further, as the mesh-like gaps are formed at the panel 422, the panel 422 has good air permeability and contributes to radiate heat of the thin-film photovoltaic cell module 10.

Further, as the panel 422 is attached at downstream of water flows of the vertical beam 421 in a biased manner, there are no blocking objects at upstream between the vertical beams 421. Thus, an operator who performs execution of the thin-film photovoltaic cell module 10 from upstream can use these spaces and it is easy for the operator to perform the operation and convenient.

Next, an example of a structure is explained in which the thin-film photovoltaic cell modules are connected in the attachment structure of the thin-film photovoltaic cell module of the embodiment.

FIG. 10 illustrates an example of a structure in which a plurality of thin-film photovoltaic cell modules 11 are connected.

Similar to the thin-film photovoltaic cell module 10, the thin-film photovoltaic cell module 11 is a photovoltaic cell module in which a semiconductor thin-film is stacked and has flexibility.

Positive and negative lead wires are attached to positive and negative electrodes provided at the semiconductor thin-film of the thin-film photovoltaic cell module 11, respectively, and the positive and negative lead wires are separately connected to terminal boxes 111 and 112 attached at both ends of the thin-film photovoltaic cell module 11.

Further, projecting or receiving connectors 111a and 112a capable of fitting in a projection-receiving relationship with each other are provided at the terminal boxes 111 and 112, respectively, and lead wires connected to a positive terminal or a negative terminal are electrically connected to the connectors 111a and 112a, respectively. With this, each of the connectors 111a and 112a is configured as a positive or negative connection terminal, and the connectors 111a and 112a are electrically connected by fitting with each other.

With the above described structure of the thin-film photovoltaic cell module 11, when installing the plurality of thin-film photovoltaic cell modules 11, by continuously installing the thin-film photovoltaic cell modules 11 at a predetermined position, it is possible to connect the connectors 111a and 112a of the adjacent thin-film photovoltaic cell module 11, and execution is easy.

Further, as output cables are not used, it is unnecessary to consider about a space for housing the output cables, contact between the output cables and the installation surface or the like.

Further, the thin-film photovoltaic cell module 11 may be directly installed on the installation surface using the above described adhesive agent 3 on the installation surface or the thin-film photovoltaic cell module 11 may be installed on the installation surface via a mounting.

FIG. 11 illustrates another example of a structure in which a plurality of thin-film photovoltaic cell modules 12 are connected.

Similar to the thin-film photovoltaic cell module 11, terminal boxes 121 connected to positive terminal or the negative terminals, respectively, are attached at both ends of the thin-film photovoltaic cell module 12. The terminal boxes 121 attached at the both ends have the same structure regardless of being connected to the positive terminal or the negative terminal, and each of the terminal boxes 121 is provided with receiving connectors 121a at both end portions to which connection connectors 122 or connection cables 123 that connect the terminal boxes 121 are connected.

Here, a pair of projecting connectors placed with a predetermined interval and facing the same direction are provided at the connection connector 122, and both of the connectors are configured to be capable of fitting with the receiving connector 121a of the terminal box 121. Further, each of the connectors provided at both ends of the connection cable 123 has a projecting shape, and both of the connectors are configured to be capable of fitting with the receiving connector 121a of the terminal box 121. Further, although the connector 121a provided at the terminal box 121 is explained as a receiving connector in the example illustrated in FIG. 11, alternatively, projecting connectors may be provided at the terminal box 121 and the connection connector 122 and the connection cable 123 may be configured to include receiving connectors, respectively. Further, each of the positive terminal and the negative terminal of the thin-film photovoltaic cell module 11 may have a projecting connector and a receiving connector.

When connecting the thin-film photovoltaic cell modules 12 in series in the width direction, as illustrated in FIG. 11-(c), the connector 121a at positive of the terminal box 12 of one of the thin-film photovoltaic cell modules 12 and the connector 121a at negative of the terminal box 12 of the adjacent other of the thin-film photovoltaic cell modules 12 are connected by the connection connector 122. At this time, the connectors 121a facing the same direction of the pair of thin-film photovoltaic cell modules 12 are connected by the connection connector 122, and the connectors 121a facing the other direction may be covered by a cap or the like.

Meanwhile, when connecting the thin-film photovoltaic cell modules 12 in parallel in a longitudinal direction, as illustrated in FIG. 11-(d), the connector 121a at positive or negative of the terminal box 121 of one of the thin-film photovoltaic cell modules 12 and the connector 121a at the same pole of the terminal box 121 of the adjacent other of the thin-film photovoltaic cell modules 12 are connected by the connection cable 123. At this time, the connectors 121a of the pair of thin-film photovoltaic cell modules 12 facing with each other may be connected by the connection cable 123.

According to this example, it is unnecessary to prepare terminal boxes 121 of different structures for positive and negative poles. Further, the length of the connection cable 123 is determined by the size of the thin-film photovoltaic cell module 12 and does not depend on the installation place of the thin-film photovoltaic cell module 12. Thus, it is possible to previously prepare the connection cable 123 with a predetermined length, and looseness of the connection cable 123 can be suppressed.

Next, another example in which the thin-film photovoltaic cell module is attached to the installation surface via a predetermined attachment member is explained.

Figure 12:
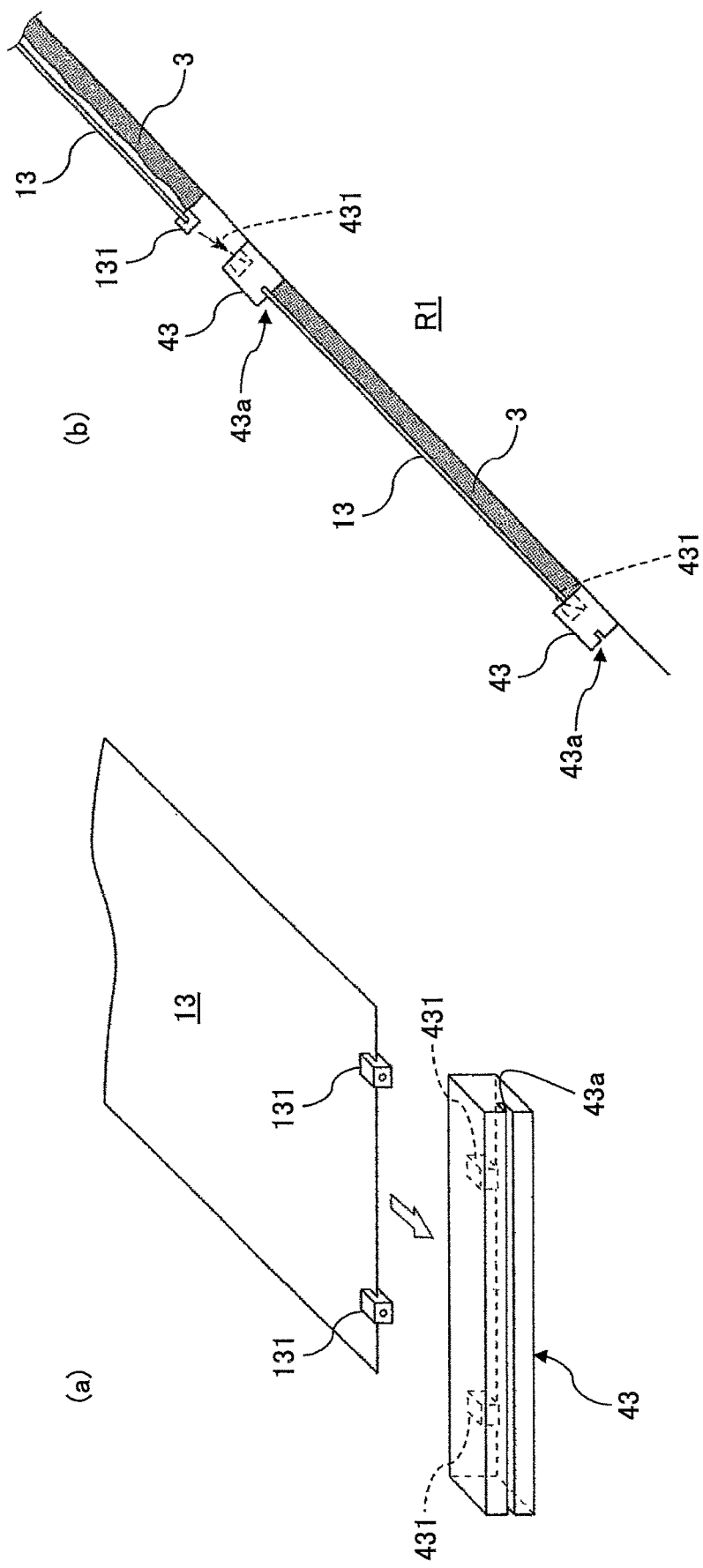
FIG. 12 is a view illustrating an example of the attachment structure of the thin-film photovoltaic cell module of the embodiment, wherein (a) is a perspective view illustrating a connection structure of the thin-film photovoltaic cell module and the mounting and (b) is a side view illustrating the connection structure of the thin-film photovoltaic cell module and the mounting.

FIG. 12 illustrates an example of a structure in which a plurality of thin-film photovoltaic cell modules 13 are connected by mountings 43 and the thin-film photovoltaic cell modules 13 are attached to the installation surface R1.

The thin-film photovoltaic cell module 13 is a photovoltaic cell module with flexibility in which a semiconductor thin-film is stacked. Positive and negative lead wires are attached to positive and negative electrodes provided at the semiconductor thin-film of the thin-film photovoltaic cell module 13, and these positive and negative lead wires are separately connected to a pair of connectors 131 that are attached at an end portion of the thin-film photovoltaic cell module 13 in a longitudinal direction.

The mounting 43 is a longitudinal rod member and fixed on the installation surface R1 by a predetermined screw, a metal fitting or the like, and is a member to which the thin-film photovoltaic cell module 13 is attached.

The mounting 43 is provided with connectors 431 at one side end portion to which connectors 131 of the thin-film photovoltaic cell module 13 are inserted, respectively. Further, the mounting 43 is provided with an insertion groove 43a to which a side end portion of the thin-film photovoltaic cell module 13 is inserted at a side end portion opposite from the side end portion where the connectors 431 are provided.

Here, either of and the other of the connectors 131 of the thin-film photovoltaic cell module 13 and the connectors 431 of the mounting 43 have projecting fitting structures and receiving fitting structures, respectively, and are configured to be capable of being electrically connected by fitting with each other.

Further, wires are provided in the mounting 43 and it is configured that the lead wires or the like electrically connected to the connectors 431 can be led out or connected to wires outside the mounting 43, or in the adjacent other mounting 43.

Further, when attaching the thin-film photovoltaic cell module 13 to the mounting 43, a side end portion of the thin-film photovoltaic cell module 13 opposite from the side end portion at which the connectors 131 are provided is inserted in the insertion groove 43a.

By the mounting 43, when attaching the thin-film photovoltaic cell module 13 to the installation surface R1, as illustrated in FIG. 12-(b), a plurality of mountings 43 are installed on the installation surface R1 with a constant pitch, and then the connectors 131 at the one end side of the thin-film photovoltaic cell module 13 are connected to the connectors 431 of the mounting 43. Further, the connectors 131 at the other end are inserted in the insertion groove 431. Further, the thin-film photovoltaic cell module 13 and the installation surface R1 may be adhered by the adhesive agent 3 between the adjacent mountings 43.

With this, just by inserting one end of the thin-film photovoltaic cell module 13 in the insertion groove 43a of the mounting 43 and connecting the connectors 131 of the thin-film photovoltaic cell module 13 and the connectors 431 of the mounting 43, laying out of wirings of the thin-film photovoltaic cell module 13 and installation on the installation surface R1 can be performed at once, and it is convenient.

Further, although the pair of connectors 131 of the thin-film photovoltaic cell module 13 electrically connected to positive and negative electrodes are provided at one side end portion of the thin-film photovoltaic cell module 13 in this example, the connectors 131 may be separately provided at one side end portion and an opposite side end portion. In such a case, the connectors 431 are provided at one side end portion and an opposite side end portion of the one side end portion of the mounting 43 to correspond to the connectors 131.

Further, in order to strengthening the connection between the connectors 131 of the thin-film photovoltaic cell module 13 and the connectors 431 of the mounting 43, the number of the connectors 131 and the corresponding connectors 431 may be increased.

Next, another example of the attachment structure in which the thin-film photovoltaic cell module is attached to the installation surface via a predetermined attachment member is explained.

Figure 13:
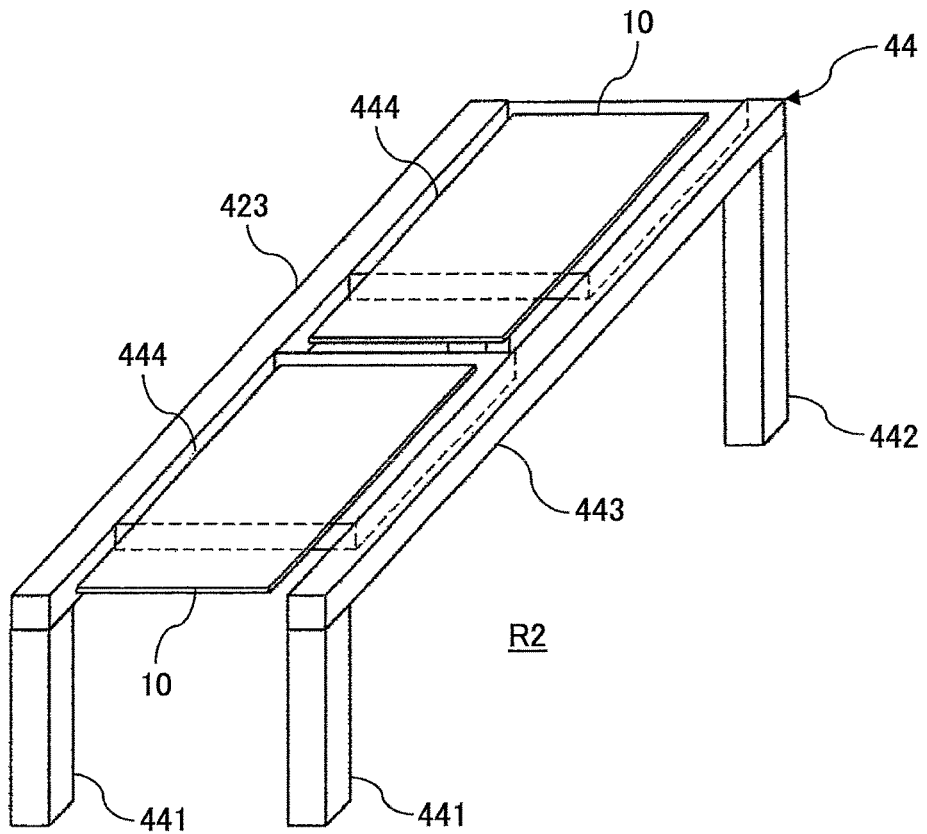
FIG. 13 is a perspective view illustrating an example of the attachment structure of the thin-film photovoltaic cell module of the embodiment.

FIG. 13 illustrates an example in which the thin-film photovoltaic cell module 10 is attached to a flat installation surface R2 such as ground, a roof floor or the like via a mounting 44.

The mounting 44 provided on the installation surface R2 includes longitudinal columns 441 and 442 that stand on the installation surface R2, vertical beams 443 that joint the columns 441 and 442, and tabular support plates 444 each of which is hung between the vertical beams 443.

It is preferable that the columns 441 are shorter than the columns 442, and the mounting 44 is tilted such that the column 441 side is lower than the column 442 side in total.

The support plate 444 has a width at least greater than or equal to the width of the thin-film photovoltaic cell module 10 that is attached at a upper surface side and has a length shorter than the length of the thin-film photovoltaic cell module 10. Further, the support plates 444 are provided at a predetermined pitch interval.

Further, the support plate 444 may be configured by a mesh panel such as a wire mesh or the like.

The thin-film photovoltaic cell module 10 is attached on the support plate 444 by being adhered by the adhesive agent under a status that is protruded from the support plate 444 at downstream of water flows along the tilt of the mounting 44. In other words, as the length of the support plate 444 is shorter than the length of the thin-film photovoltaic cell module 10 and the support plates 444 are spaced apart with each other, end portions at downstream of water flows are floated.

As such, by providing the thin-film photovoltaic cell module 10 so as the end portion at downstream of water flows is floated, even when snow is deposited on the thin-film photovoltaic cell module 10, the snow slips down downstream in accordance with the tilt of the mounting 44, the end portion at downstream that is floated is bent and the snow deposited on the thin-film photovoltaic cell module 10 can be fallen on the ground.

Figure 14:
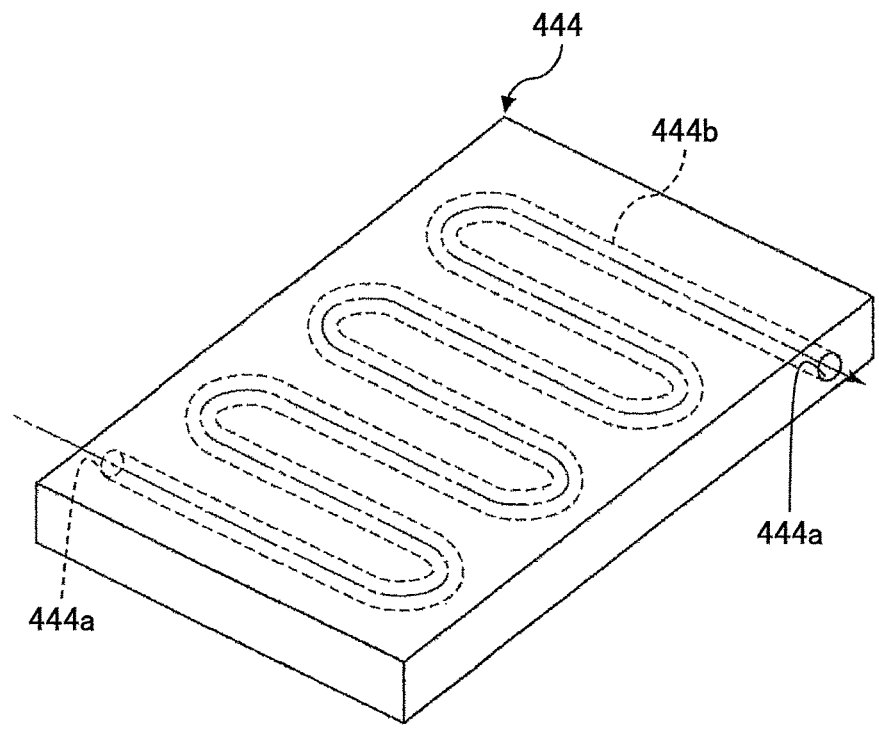
FIG. 14 is a perspective view illustrating an example of a panel that is used in the attachment structure of the thin-film photovoltaic cell module of the embodiment.

Further, as illustrated in FIG. 14, the above described support plate 444 may have a predetermined thickness, and may be provided with a water passage 444b that can flow water from a water passage hole 444a provided at one side end portion to a water passage 444a provided at another side end portion.

By flowing water through the water passage 444b, the thin-film photovoltaic cell module 10 can be cooled.

Next, an example of the attachment structure is explained in which the thin-film photovoltaic cell module is attached to the installation surface such as a wall surface or the like via the predetermined attachment member.

Figure 15:
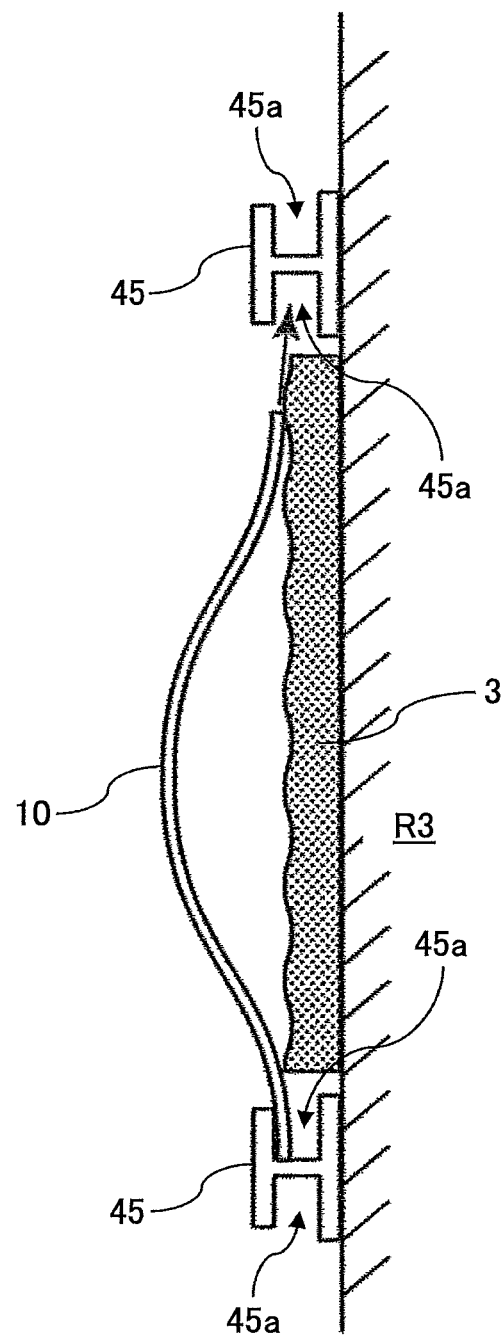
FIG. 15 is a side view illustrating an example of the attachment structure of the thin-film photovoltaic cell module of the embodiment.

FIG. 15 illustrates an example in which the thin-film photovoltaic cell module 10 is attached to a wall surface as a vertical or tilted installation surface R3.

The thin-film photovoltaic cell module 10 is attached to the installation surface R3 by being adhered by the adhesive agent 3, and upper and lower ends are fixed by rails 45.

The rail 45 is a longitudinal rod member and is provided with insertion grooves 45a at both side end portions to which the thin-film photovoltaic cell modules 10 are inserted.

Further, the rail 45 may be adhered to the installation surface R3 by an adhesive agent, or may be fixed to the installation surface R3 using a metal fitting such as a screw or the like.

When attaching the thin-film photovoltaic cell module 10 to the installation surface R3, a pair of the rails 45 are previously attached on the installation surface R3 with a space corresponding to the length of the thin-film photovoltaic cell module 10, and the adhesive agent 3 is coated on the installation surface R3. Then, after inserting one end of the thin-film photovoltaic cell module 10 in the insertion groove 45a of one of the rails 45, the thin-film photovoltaic cell module 10 is deformed and the other end of the thin-film photovoltaic cell module 10 is inserted in the insertion groove 45a of the other of the rails 45.

As such, by fixing the thin-film photovoltaic cell module 10 from upper and lower sides by the rails 45 in addition to the adhesive agent 3, the thin-film photovoltaic cell module 10 can be prevented from being slide and fallen from the installation surface R3.

Figure 16:
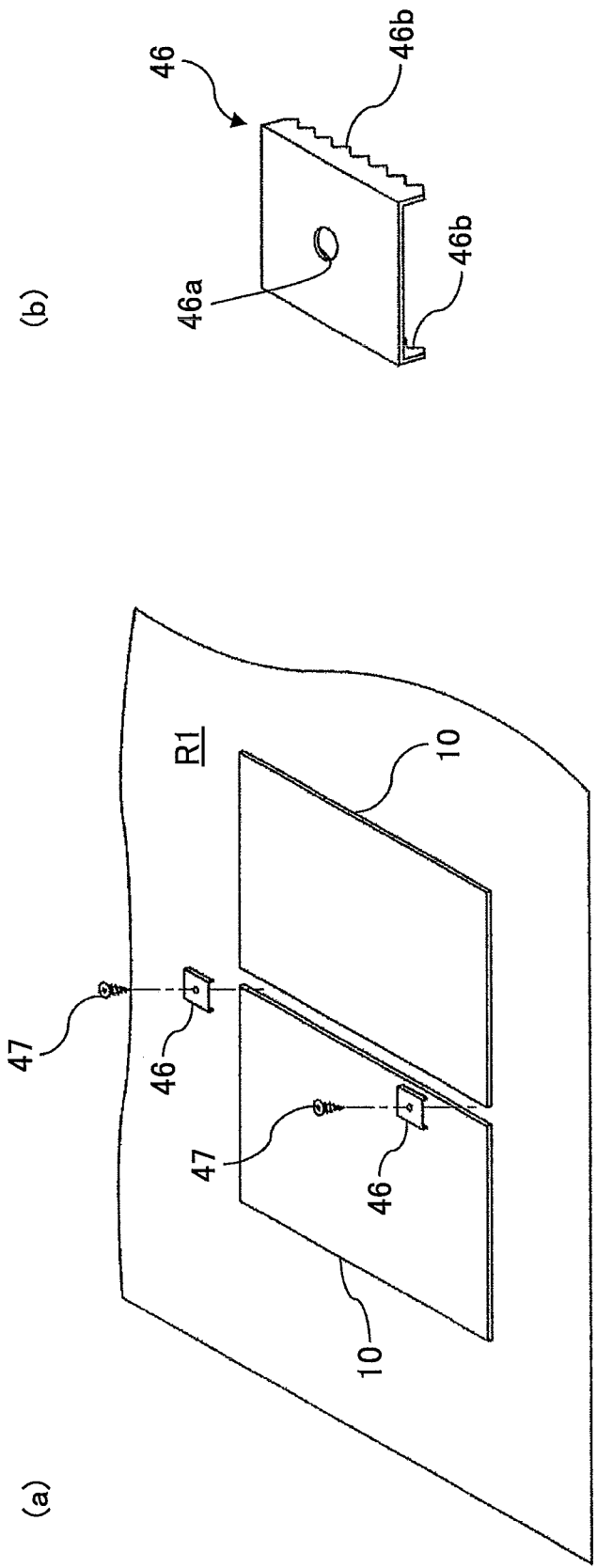
FIG. 16 is a view illustrating an example of the attachment structure of the thin-film photovoltaic cell module of the embodiment, wherein (a) is a plan view and (b) is a perspective view illustrating a metal fitting used for attachment.

FIG. 16 illustrates another example of the attachment structure in which the thin-film photovoltaic cell module 10 is attached to the installation surface R1.

In this example, the thin-film photovoltaic cell module 10 is adhered to the installation surface R1 by the adhesive agent 3 and also is fixed by metal fittings 46.

As illustrated in FIG. 16-(b), the metal fitting 46 is a rectangular metal plate provided with a small screw hole 46a at its center and provided with a pair of engaging and fixing claws 46b at its both side end portions that engage and fix a surface of the thin-film photovoltaic cell module 10. Further, as a glass plate is used as a surface protection material for a general photovoltaic cell module, it is impossible for the engaging and fixing claw 46b to engage and fix the surface. However, if a transparent resin plate is used as a surface protection material in order to give flexibility to the thin-film photovoltaic cell module 10, it is possible to have the engaging and fixing claw 46b engage and fix such a surface protection material.

When providing the thin-film photovoltaic cell module 10 on the installation surface R1, as well as adhering the thin-film photovoltaic cell module 10 to the installation surface R1 by the adhesive agent 3, the metal fitting 46 is attached between a pair of the thin-film photovoltaic cell modules 10 adhered to the installation surface R1. When attaching the metal fitting 46, each of the pair of the engaging and fixing claws 46b of the metal fitting 46 is engaged and fixed at the surface of the adjacent thin-film photovoltaic cell modules 10 at end portions. Then, inserting the small screw 47 in the small screw hole 46a to fix to the installation surface R1.

As such, by fixing the thin-film photovoltaic cell module 10 to the installation surface R1 not only by the adhesive agent 3, but also using the metal fitting 46, it is possible to further strongly install the thin-film photovoltaic cell module 10 to the installation surface R1. Furthermore, a structure is possible in which the adhesive agent 3 is not used and the thin-film photovoltaic cell module 10 is provided at the installation surface R1 only by the metal fitting 46.

Figure 17:
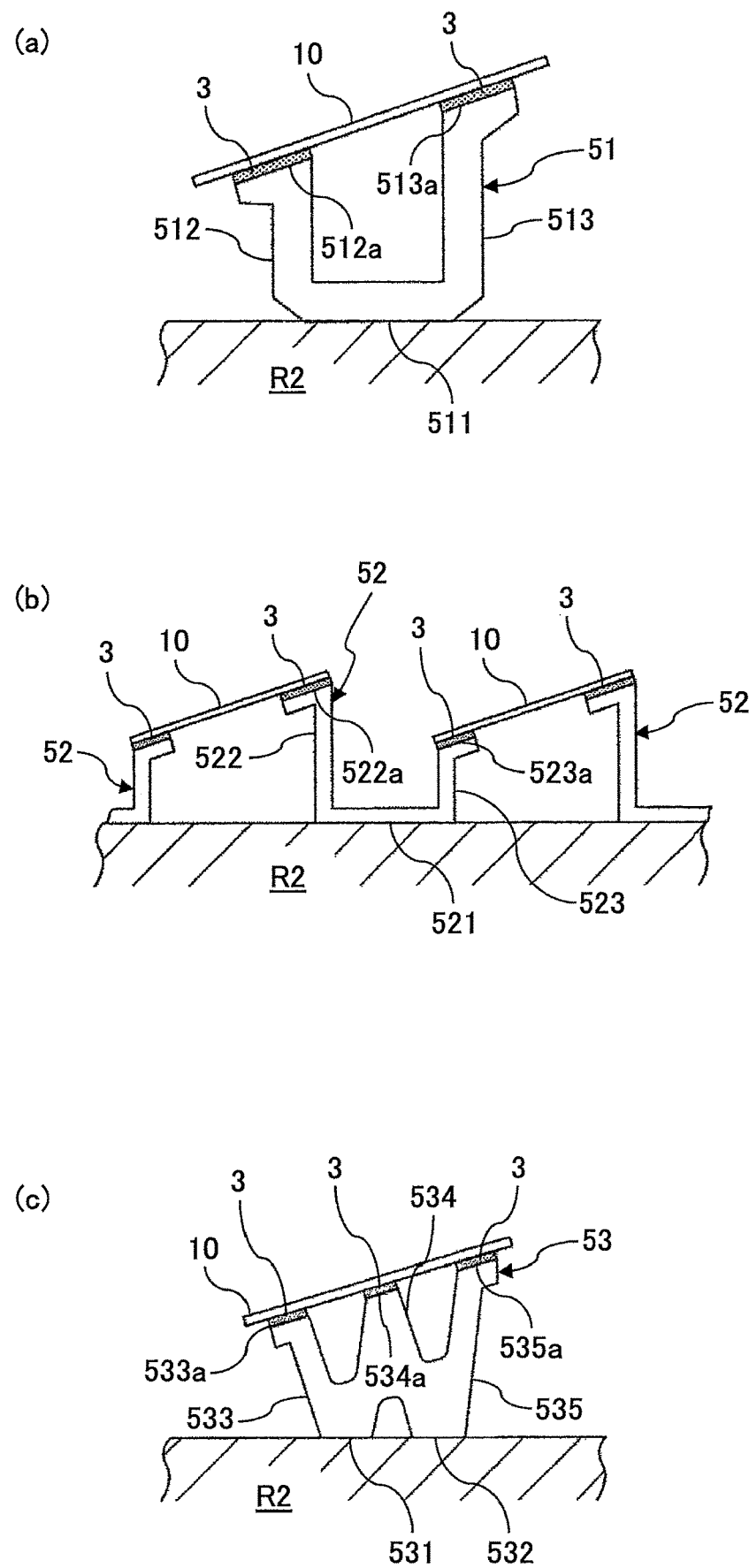
FIG. 17 is a view illustrating an example of the attachment structure of the thin-film photovoltaic cell module of the embodiment, wherein (a), (b) and (c) are side views illustrating three types of alternative examples.

Next, FIG. 17 illustrates another example in which the thin-film photovoltaic cell module 10 is attached to the flat installation surface R2 such as ground or a roof floor via the predetermined attachment member.

Structural bodies 51, 52 and 53, each of which is a predetermined attachment member, are attachment members for attaching the thin-film photovoltaic cell module 10 on the installation surface, and each of which is another example. Either of each of the structural bodies 51, 52 and 53 is made of a material having a predetermined weight such as concrete or the like, installed on the installation surface R2, and the thin-film photovoltaic cell module 10 is attached at its upper surface.

The structural body 51 illustrated in FIG. 17-(a) has a substantially U shape, and includes a base portion 511 that is mounted on the installation surface R2 and support portions 512 and 513 that are extending upward by being bent from both ends of the base portion 511. Upper surfaces of the support portions 512 and 513 configure attachment surfaces 512a and 513a for attaching the thin-film photovoltaic cell module 10, respectively.

Further, the structural body 51 has a certain width necessary for supporting the thin-film photovoltaic cell module 10 on the attachment surfaces 512a and 513a, and for example, has a thickness same as that of the thin-film photovoltaic cell module 10.

The support portion 512 is lower than the support portion 513, further, the attachment surfaces 512a and 513a conform a difference of elevation of the support portions 512 and 513, and form tilted surfaces that becomes lower from the support portion 513 toward the support portion 512, respectively.

When installing the thin-film photovoltaic cell module 10 on the installation surface R2 using the structural body 51, the thin-film photovoltaic cell module 10 is attached on the attachment surfaces 512a and 513a by being adhered by the adhesive agent 3. As the support portions 512 and 513 have the difference of elevation and the attachment surfaces 512a and 513a form the tilted surfaces, respectively, the thin-film photovoltaic cell module 10 attached on the attachment surfaces 512a and 513a tilts to be lower from the support portion 513 toward the support portion 512.

As the structural body 51 has a certain weight, regardless of influence of wind or the like, the thin-film photovoltaic cell module 10 can be installed on the installation surface R2. Further, it is possible to install the thin-film photovoltaic cell module 10 in a tilted manner to become a suitable angle for receiving sunlight due to the difference of elevation of the support portions 512 and 513 or the tilt of the attachment surfaces 512a and 513a.

The structural body 52 illustrated in FIG. 17-(b) has a substantially U shape, and includes a base portion 521 mounted on the installation surface R2 and support portions 522 and 523 that are extending upward by being bent from both ends of the base portion 521. Upper surfaces of the support portions 522 and 523 configure attachment surfaces 522a and 523a for attaching the thin-film photovoltaic cell module 10.

Further, similar to the structural body 51, the structural body 52 has a certain width necessary for supporting the thin-film photovoltaic cell module 10 on the attachment surfaces 522a and 523a, and for example, has a thickness same as that of the thin-film photovoltaic cell module 10.

The support portion 522 is higher than the support portion 523, and further, the attachment surfaces 522a and 523a form tilted surfaces that becomes lower from the support portion 523 toward the support portion 522, respectively.

When installing the thin-film photovoltaic cell module 10 on the installation surface R2 using the structural body 52, a plurality of the structural bodies 52 are provided on the installation surface R2 with a constant pitch interval, one end side of the thin-film photovoltaic cell module 10 is attached to the attachment surface 522a of one of the structural body 52, among the adjacent structural bodes 52 and the other end side of the thin-film photovoltaic cell module 10 is attached to the attachment surface 523a of the other structural body 52.

Further, the thin-film photovoltaic cell module 10 is attached on the attachment surfaces 522a and 523a by being adhered by the adhesive agent 3.

For the structural body 52 as well, as the support portions 522 and 523 have difference of elevation and the attachment surfaces 522a and 523a form the tilted surfaces, respectively, the thin-film photovoltaic cell module 10 attached on the attachment surfaces 522a and 523a tilts to be lower from the support portion 513 of the one of the adjacent structural bodies 52 toward the support portion 512 of the other of the adjacent structural bodies 52.

With this structural body 52, the thin-film photovoltaic cell module 10 can be installed on the installation surface R2 under a status that end portions of the thin-film photovoltaic cell module 10 are supported regardless of the length of the thin-film photovoltaic cell module 10. Thus, the end portions of the thin-film photovoltaic cell module 10 can be prevented from being deflected.

The structural body 53 illustrated in FIG. 17 (*c*) has a substantially W shape, and includes a pair of base portions 531 and 532 mounted on the installation surface R2, a support portion 533 extending in an inclined upward direction from the base portion 531, a support portion 534 integrally extending upward from the base portions 531 and 532 and a support portion 535 extending in an inclined upward direction from the base portion 532. Upper surfaces of the support portions 533, 534 and 535 configure attachment surfaces 533*a*, 534*a* and 535*a* for attaching the thin-film photovoltaic cell module 10, respectively.

Further, similar to the structural body 51, the structural body 53 has a certain width necessary for supporting the thin-film photovoltaic cell module 10 on the attachment surfaces 533*a*, 534*a* and 535*a*, and for example, has a thickness same as that of the thin-film photovoltaic cell module 10.

The support portions 535, 534 and 533 are configured to be lower in this order, further, the attachment surfaces 533*a*, 534*a* and 535*a* conform a difference of elevation of the support portions 533, 534 and 535 and form tilted surfaces that become lower from the support portion 535 toward the support portion 533, respectively.

When installing the thin-film photovoltaic cell module 10 on the installation surface R2 using the structural body 53, the thin-film photovoltaic cell module 10 is attached on the attachment surfaces 533*a*, 534*a* and 535*a* by being adhered by the adhesive agent 3. As the support portions 533, 534 and 535 have the difference of elevation and the attachment surfaces 533*a*, 534*a* and 535*a* are the tilted surfaces, respectively, the thin-film photovoltaic cell module 10 attached on the attachment surfaces 533*a*, 534*a* and 535*a* tilts to be lower from the support portion 535 toward the support portion 533.

With this structural body 53, as the thin-film photovoltaic cell module 10 is supported not only at near its end portions but also at a center portion, the thin-film photovoltaic cell module 10 is prevented from being deflected toward center and can be retained in a straight status.

Figure 18:
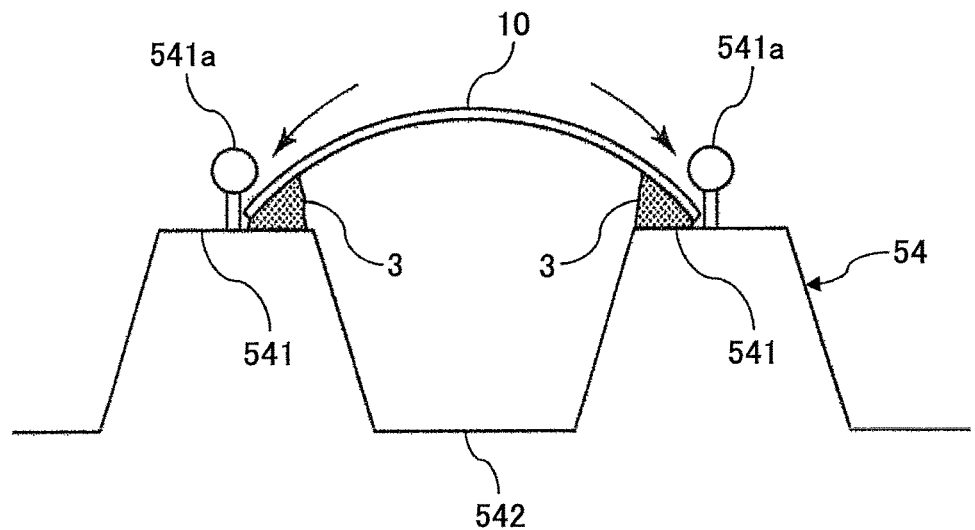
FIG. 18 is a side view illustrating an example of the attachment structure of the thin-film photovoltaic cell module of the embodiment.

Next, FIG. 18 illustrates an example of the attachment structure in which the thin-film photovoltaic cell module 10 is attached to a folded plate roof 54, in particular, a seem type folded plate roof.

The folded plate roof 54 as the installation surface of the example has a structure in which a folded plate body that is composed of a steel plate having a wave pattern in which peak portions 541 and valley portions 542 are alternately and continuously provided is fixed on a tight frame.

When attaching the thin-film photovoltaic cell module 10 to the folded plate roof 54, the thin-film photovoltaic cell module 10 is provided to be hung over the peak portions 541 of the folded plate roof 54. At this time, the adhesive agent 3 is coated at contacting portions of the thin-film photovoltaic cell module 10 and the peak portions 541 and the thin-film photovoltaic cell module 10 and the folded plate roof 54 are adhered.

At this time, when the width of the thin-film photovoltaic cell module 10 is larger than a pitch of the peak portions 541 or seam portions 541*a*, the thin-film photovoltaic cell module 10 may be installed in a curved manner such that a center portion of the thin-film photovoltaic cell module 10 is elevated upward.

By installing the thin-film photovoltaic cell module in such a curved manner, draining capability of the thin-film photovoltaic cell module can be improved, further, a space is formed at a back surface of the thin-film photovoltaic cell module 10, air permeability of the back surface of the thin-film photovoltaic cell module 10 is improved by the space, and overheat of the thin-film photovoltaic cell module 10 can be prevented.

Further, a structure in which the thin-film photovoltaic cell module 10 is installed on the folded plate roof by being bent is explained in this example. The structure for attaching the thin-film photovoltaic cell module 10 by being bent may be adaptable to other different types of roofs of ridges such as a slate roof, a tiled roof or the like, in addition to the folded plate roof.

Next, a structure is described in which the thin-film photovoltaic cell module is attached to the installation surface by an adhesive means different from the above described adhesive agent.

Figure 19:
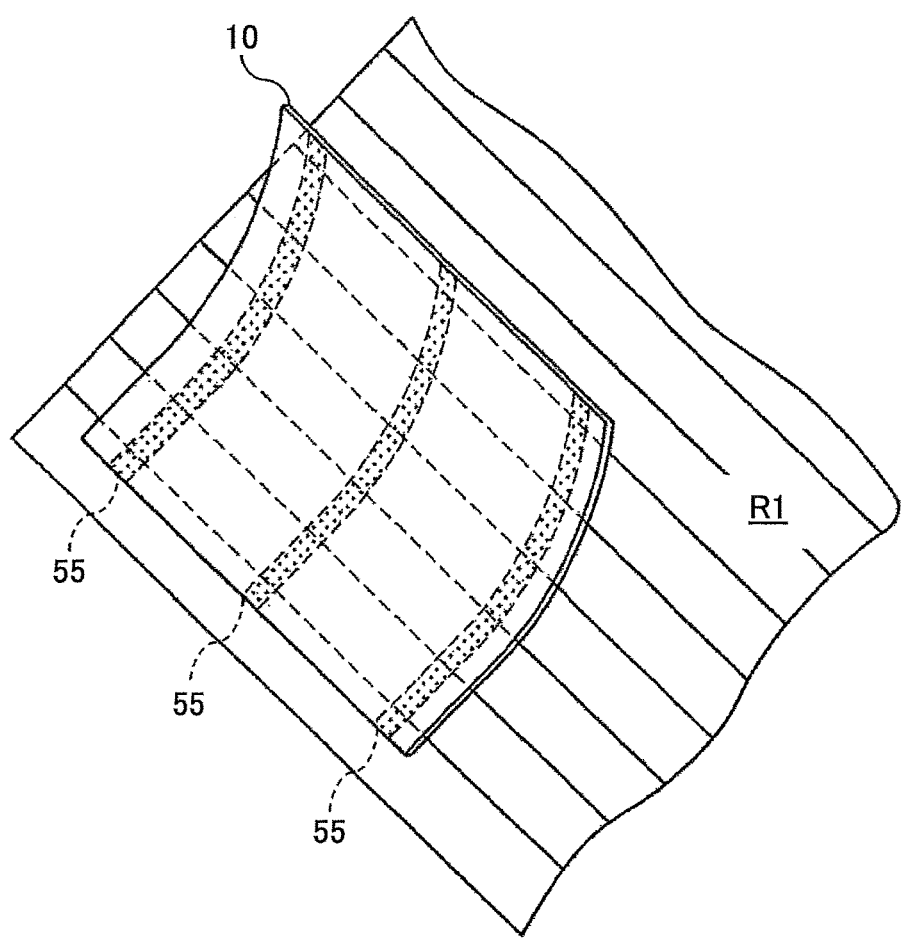
FIG. 19 is a side view illustrating an example of the attachment structure of the thin-film photovoltaic cell module of the embodiment.

FIG. 19 illustrates an example in which the thin-film photovoltaic cell module 10 is attached to the installation surface R1 such as a roof or the like by being adhered by using a double sided tape 55.

In this example, the double sided tape 55, an adhesive agent is coated on both sides thereof, is adhered at either of or both of a back surface of the thin-film photovoltaic cell module 10 or the installation surface R1, and then the thin-film photovoltaic cell module 10 is attached on the installation surface R1 to be adhered by the double sided tape 55.

According to the example, it is easy to attach the thin-film photovoltaic cell module 10 to the installation surface R1.

Next, another example of the structure is described in which the film photovoltaic cell module is attached to the installation surface by an adhesive means different from the above described adhesive agent.

Figure 20:
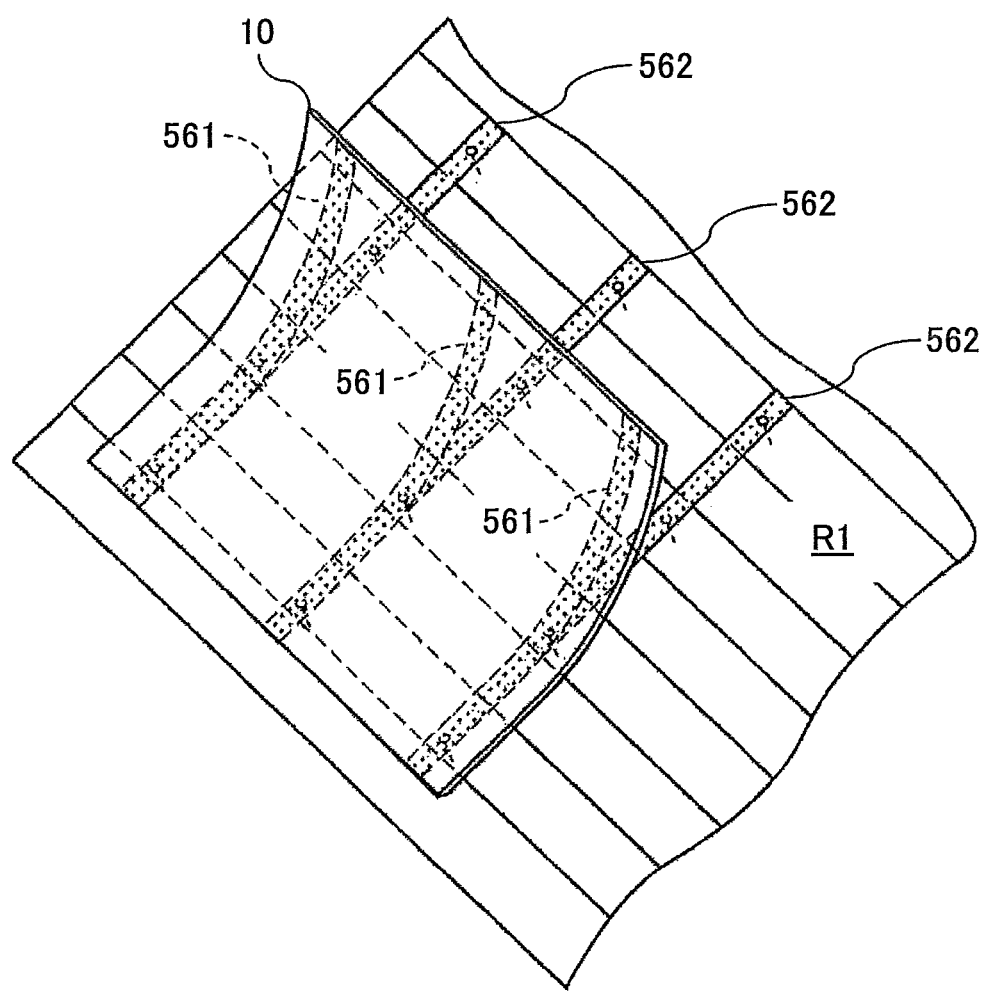
FIG. 20 is a perspective view illustrating an example of the attachment structure of the thin-film photovoltaic cell module of the embodiment.

FIG. 20 illustrates an example in which the thin-film photovoltaic cell module 10 is attached to the installation surface R1 by using a double sided fastener 56.

In this example, a loop fastener 561 (surface fastener) that is composed of a loop surface that is densely gigged in a loop form is attached to the back surface of the thin-film photovoltaic cell module 10, and a hook fastener 562 (surface fastener) that is composed of a hook surface that is densely gigged in a hook form is attached to the surface of the installation surface R1. Further, attachment of the loop fastener 561 and the hook fastener 562 to the back surface of the thin-film photovoltaic cell module 10 and the installation surface R1 are respectively performed by various means such as adhesion by an adhesive agent, fixing by a tucker or the like.

Then, by engaging the loop fastener 561 and the hook fastener 562, the thin-film photovoltaic cell module 10 can be attached to the installation surface R1.

Further, regardless of the example, the hook fastener 562 that is composed of the hook surface that is densely gigged in a hook form may be attached to the back surface of the thin-film photovoltaic cell module 10, and the loop fastener 561 that is composed of the loop surface that is densely gigged in a loop form may be attached to the surface of the installation surface R1.

According to the embodiment, as the thin-film photovoltaic cell module 10 can be detachably attached to the installation surface R1, it is possible to detach or exchange the thin-film photovoltaic cell module 10 in accordance with necessity, and it is convenient.

Next, yet further another example of the structure is described in which the film photovoltaic cell module is attached to the installation surface by an adhesive means different from the above described adhesive agent.

Figure 21:
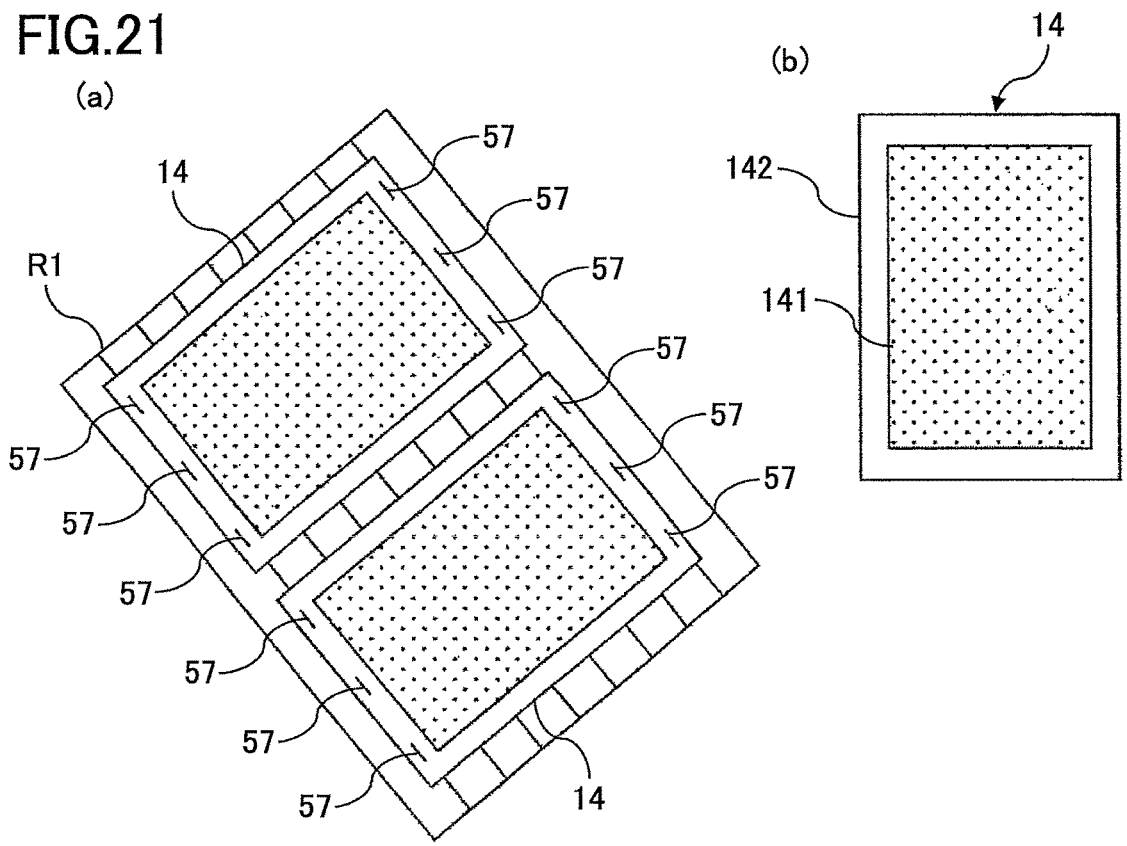
FIG. 21 is a view illustrating an example of the attachment structure of the thin-film photovoltaic cell module of the embodiment, wherein (a) is a perspective view and (b) is a plan view illustrating an example of the thin-film photovoltaic cell module to which the present example is applied.

FIG. 21 illustrates an example in which a thin-film photovoltaic cell module 14 is attached on the installation surface R1 using a tucker or the like.

As illustrated in FIG. 21-(*b*), in the thin-film photovoltaic cell module 14 of the embodiment, a semiconductor thin-film is stacked and a non-power generation area 142 is formed around a power generation area 141 that generates power by receiving light.

When attaching the thin-film photovoltaic cell module 14 to the installation surface R1, after mounting the thin-film photovoltaic cell module 14 on the installation surface R1, rivets 57 are hammered using a tucker or the like to penetrate the non-power generation area 142 and the installation surface R1.

With this, the thin-film photovoltaic cell module 14 can be easily attached on the installation surface R1 without influencing on the power generation area 141.

Further, regardless of the example, instead of hammering the rivets, using a tucker or the like, small screws, pegs or the like may be hammered at the non-power generation area 142.

Next, an alternative example of the above described attachment structure of the thin-film photovoltaic cell module using the non-power generation area is described.

Figure 22:
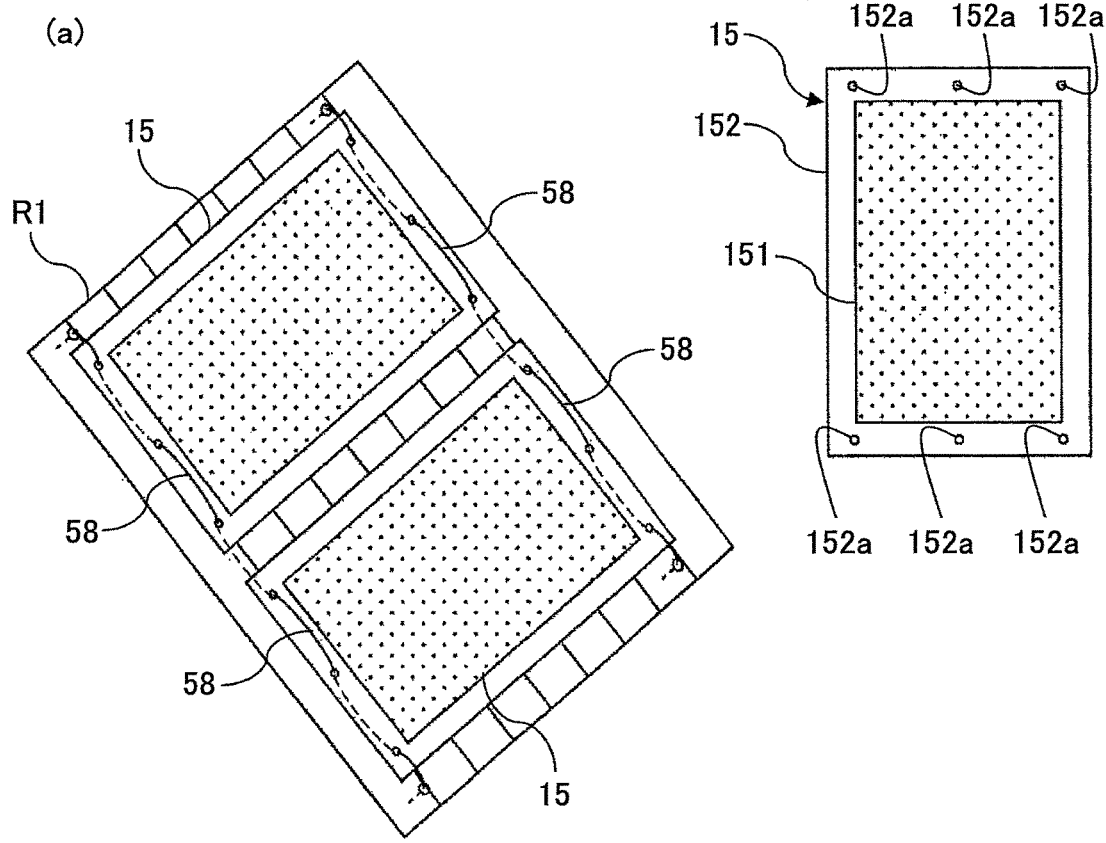
FIG. 22 is a view illustrating an example of the attachment structure of the thin-film photovoltaic cell module of the embodiment, wherein (a) is a perspective view and (b) is a plan view illustrating an example of the thin-film photovoltaic cell module to which the present example is applied.

FIG. 22 illustrates an example in which the thin-film photovoltaic cell module 15 is attached to the installation surface R1 using wires 58.

As illustrated in FIG. 22-(*b*), similar to the above described thin-film photovoltaic cell module 14, in the thin-film photovoltaic cell module 15 of the embodiment, a semiconductor thin-film is stacked and a non-power generation area 152 is formed around a power generation area 151 that generates power by receiving light. Meanwhile, different from the thin-film photovoltaic cell module 14, a plurality of through holes 152*a* for passing through a wire 58 are previously formed at both side end portions of the non-power generation area 152.

When attaching the thin-film photovoltaic cell module 15 to the installation surface R1, through holes for passing through the wire 58 are previously formed at the installation surface R1 as well. Then, after mounting the thin-film photovoltaic cell module 15 on the installation surface R1, the wire 58 is passed through the through holes provided at the installation surface R1 and the through holes 152*a* provided at the non-power generation area 152 of the thin-film photovoltaic cell module 10. Then both ends of the wire 58 are fixed at the installation surface R1. The both ends of the wire 58 may be fixed by screwing to the installation surface R1, or by attaching to anchors provided at the installation surface R1, for example.

In this example as well, the thin-film photovoltaic cell module 15 can be easily attached to the installation surface R1 without influencing on the power generation area 151.

Next, a suitable example for transporting the thin-film photovoltaic cell module is described.

Figure 23:
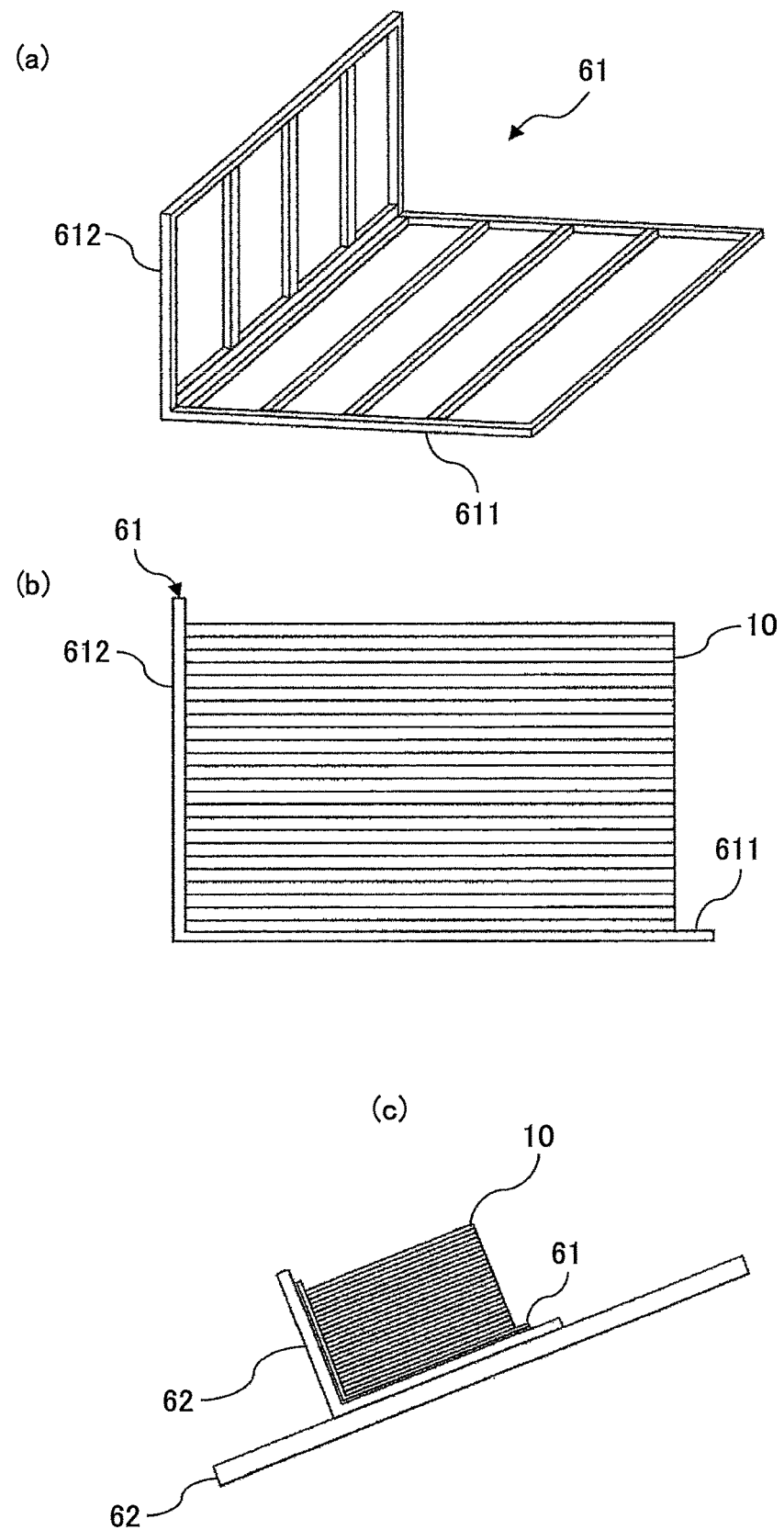
FIG. 23 is a view illustrating a pallet suitable for transporting the thin-film photovoltaic cell module to which the attachment structure of the thin-film photovoltaic cell module of the embodiment is applied, wherein (a) is a perspective view, (b) is a side view in which the thin-film photovoltaic cell modules are stacked and (c) is a side view illustrating a status in use.

FIG. 23 illustrates a pallet 61 suitable to transport the thin-film photovoltaic cell module 10, in particular, a plurality of the thin-film photovoltaic cell modules 10, and a transporting embodiment of the thin-film photovoltaic cell modules 10 by the pallet 61.

As illustrated in FIG. 23-(*a*), the pallet 61 has an L shape, and includes a mounting portion 611 on which the stacked plurality of thin-film photovoltaic cell modules 10 are mounted and a standing portion 612 that vertically stands from one side end portion of the mounting portion 611.

Further, although the pallet 61 of the embodiment is provided by assembling rod frame materials, the pallet 61 may be provided by assembling a plurality of wooden or metal flat plates, or provided by vertically bending a metal flat plate.

When transporting the plurality of thin-film photovoltaic cell modules 10 by using the pallet 61, first, as illustrated in FIG. 23-(*b*), the plurality of thin-film photovoltaic cell modules 10 are stacked on the mounting portion 611.

Then, as illustrated in FIG. 23-(*c*), the plurality of thin-film photovoltaic cell modules 10 are transported by a lifter 62 with the pallet 61. At this time, by holding the pallet 61 in an inclined manner such that the mounting portion 611 at the standing portion 612 side becomes lower, the plurality of thin-film photovoltaic cell modules 10 are supported by both surface of the mounting portion 611 and the standing portion 612 and the thin-film photovoltaic cell modules 10 can be transported in a stable status.

With this, the thin-film photovoltaic cell modules 10 can be uploaded to a high position such as a roof or a roof floor of a construction such as a ridge or the like.

Next, an example of a structure for increasing the rigidity of the thin-film photovoltaic cell module in the attachment structure of the thin-film photovoltaic cell module of the embodiment is described.

Figure 24:
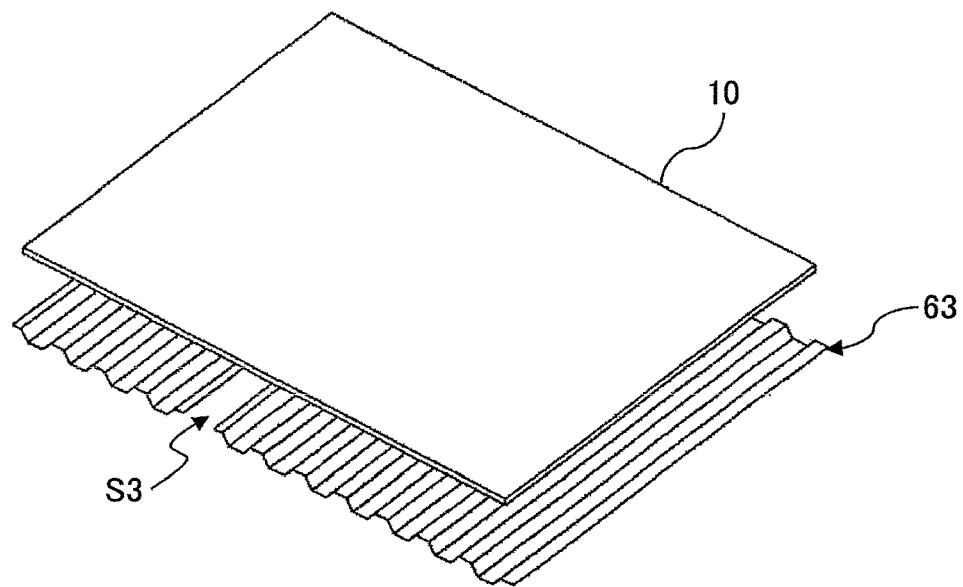
FIG. 24 is a perspective view illustrating an example of the attachment structure of the thin-film photovoltaic cell module of the embodiment.

FIG. 24 illustrates an example in which a back support 63 that is composed of a metal plate having a wave pattern in which peak portions and valley portions are alternately and continuously provided is attached to the back surface of the thin-film photovoltaic cell module 10 by being adhered by an adhesive agent.

A gap S3 is provided at the back support 63. The terminal box provided at the back surface side of the thin-film photovoltaic cell module 10 can be housed in the gap S3 and the output cables led out from the terminal box are laid out in the gap S3.

Further, it is preferable to use, as the adhesive agent that adheres the thin-film photovoltaic cell module 10 and the back support 63, a weatherproof adhesive agent such as a butyl based adhesive agent or the like.

According to the embodiment, the rigidity of the thin thin-film photovoltaic cell module 10 can be increased and load resistance can be improved.

Next, another example of a structure for increasing the rigidity of the thin-film photovoltaic cell module in the attachment structure of the thin-film photovoltaic cell module of the embodiment is described.

Figure 25:
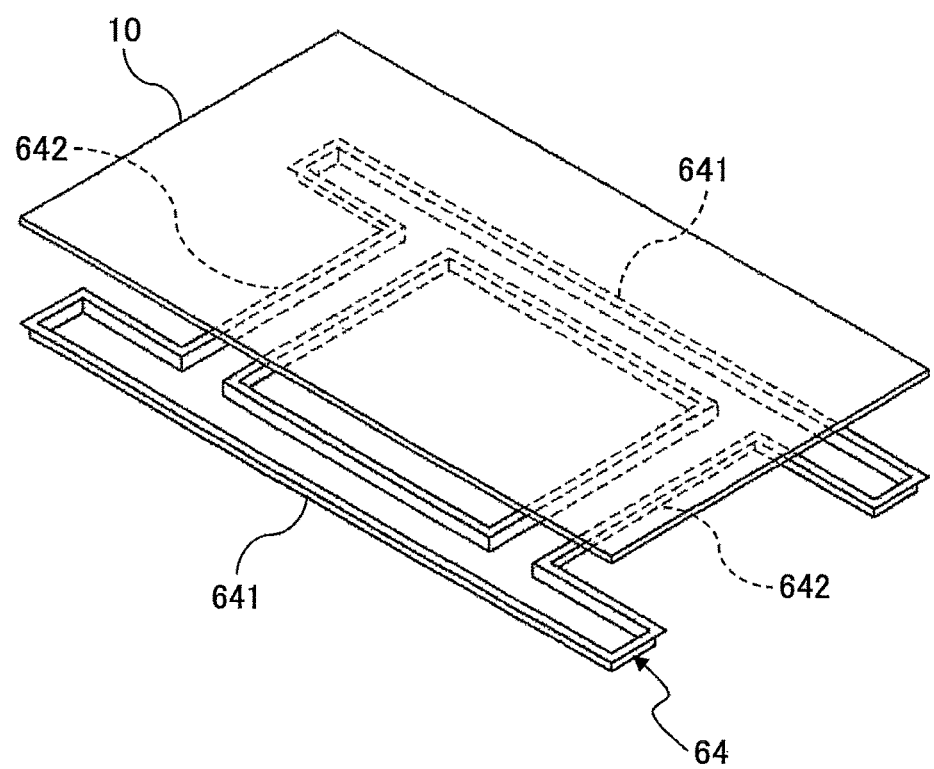
FIG. 25 is a perspective view illustrating an example of the attachment structure of the thin-film photovoltaic cell module of the embodiment.

FIG. 25 illustrates an example in which a back support 64 having a ladder shape or a substantially lattice shape is attached on the back surface of the thin-film photovoltaic cell module 10 by being adhered by an adhesive agent.

The back support 64 is made of resin or metal and has a pair of support blocks 641 having substantially the same length as two facing longitudinal end portions of the thin-film photovoltaic cell module 10 and supporting the two facing longitudinal end portions, and a pair of support blocks 642 that connect the pair of support blocks 641.

According to the example as well, the rigidity of the thin thin-film photovoltaic cell module 10 can be increased and load resistance can be improved. Further, although it is exemplified in FIG. 25 that the back support 64 has a ladder shape, instead of this, the back support 64 may be configured to have an X shape or a tetragonal shape.

Next, another example is explained in which the thin-film photovoltaic cell module is attached to the installation surface via the predetermined attachment member.

Figure 26:
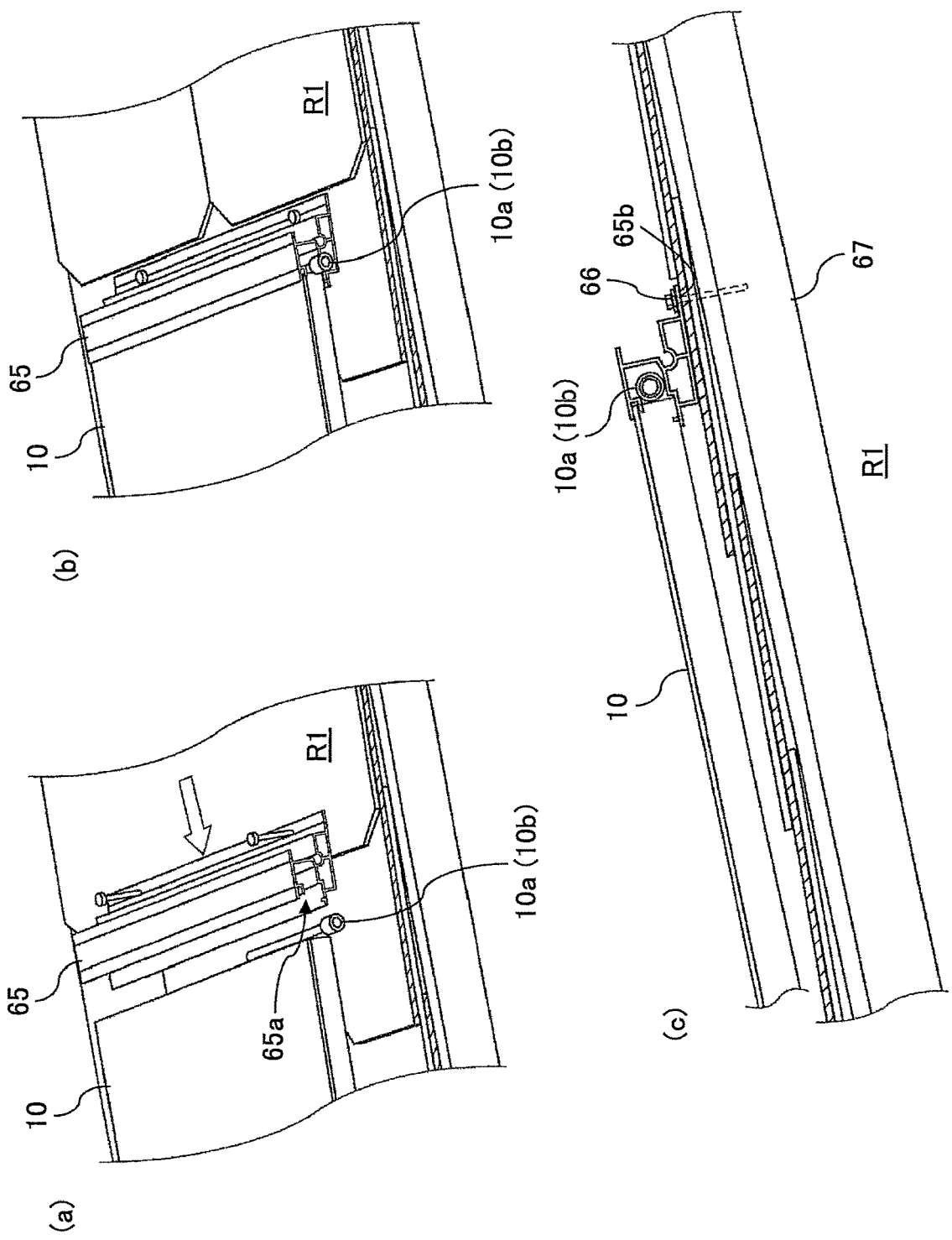
FIG. 26 is a view illustrating an example of the attachment structure of the thin-film photovoltaic cell module of the embodiment, wherein (a) is a perspective view illustrating a status when inserting the thin-film photovoltaic cell module in a mounting, (b) is a perspective view in which the thin-film photovoltaic cell module is inserted in the mounting and (c) is a side view illustrating the status in which the thin-film photovoltaic cell module is inserted in the mounting.

FIG. 26 illustrates an example of the attachment structure in which the thin-film photovoltaic cell module 10 is attached to the installation surface R1 via a mounting 65.

The mounting 65 is a longitudinal rod member, provided with an insertion groove 65*a* at a side end portion to which the thin-film photovoltaic cell module 10 can be inserted, and supports the one side end portion of the thin-film photovoltaic cell module 10 inserted therein on the installation surface R1 by the insertion groove 65*a*.

Further, a sufficient space is provided in a depth of the insertion groove 65*a*, and the output cable 10*a* (10*b*) led out from the thin-film photovoltaic cell module 10 can be housed and laid out in the space of the insertion groove 65*a* when inserting the thin-film photovoltaic cell module 10 in the insertion groove 65*a*.

Further, the mounting 65 is fixed at the installation surface R1.

Figure 27:
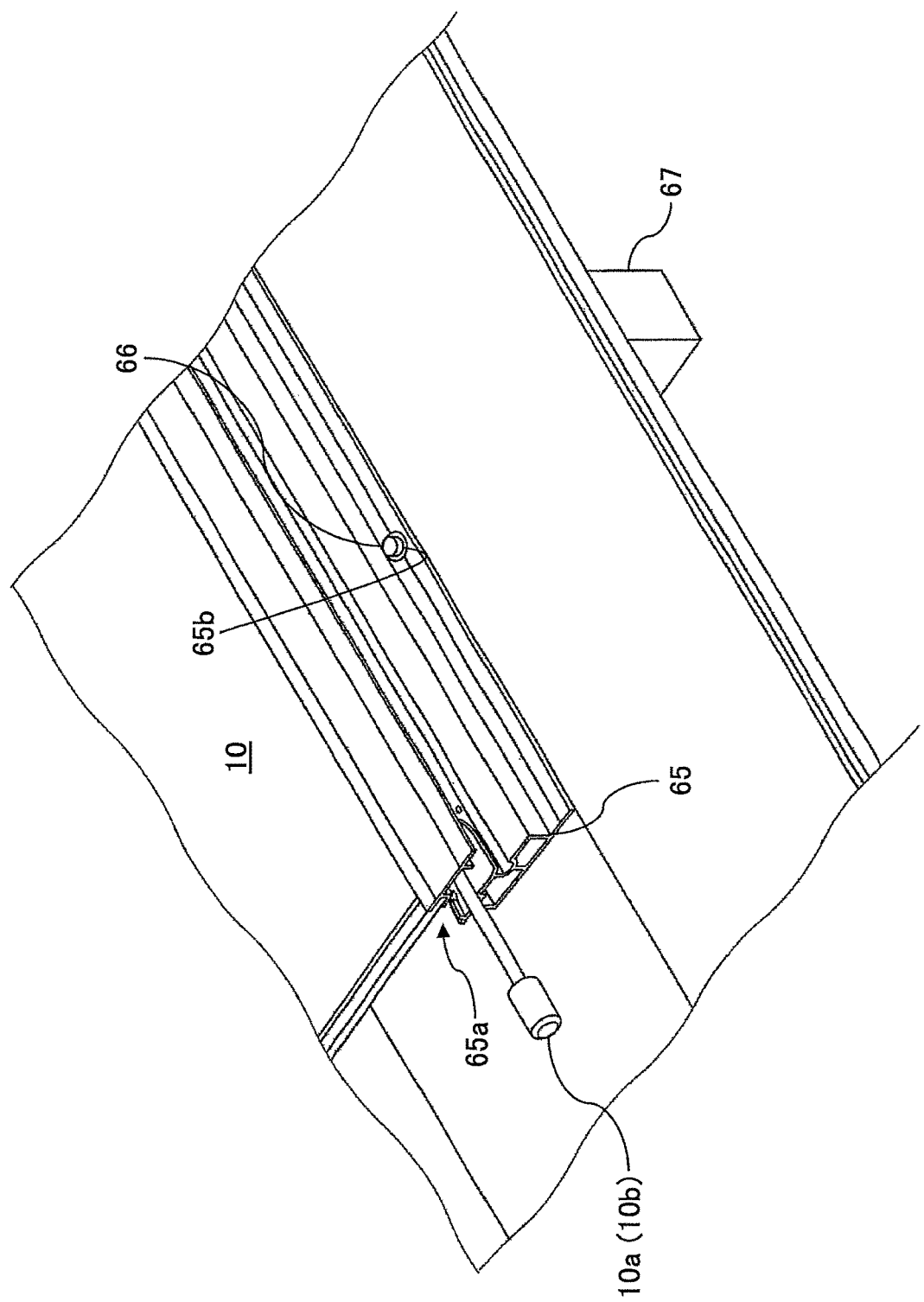
FIG. 27 is a perspective view illustrating a fixing structure of a mounting and an installation surface in an example of the attachment structure of the thin-film photovoltaic cell module of the embodiment.

Here, as illustrated in FIG. 27, the mounting 65 is fixed to the installation surface R1 by providing through holes 65*b* at the mounting 65 in accordance with a pitch interval of rafters 67 previously or at the place of execution and inserting screws 66 in the through holes 65*b* to be screwed in the rafters 67 of the installation surface R1, for example. By directly screwing the screws in the rafters 67, it is unnecessary to additionally prepare a specific fixing metal fitting or the like for fixing the mounting 65 to the installation surface R1, cost is reduced and execution can be simplified.

NUMERALS

10 thin-film photovoltaic cell module
101 terminal box
101*a* output cable
101*b* output cable
11 thin-film photovoltaic cell module
111 terminal box
111*a* connector
112 terminal box
112*a* connector
12 thin-film photovoltaic cell module
121 terminal box
121*a* connector
122 connection connector
123 connection cable
13 thin-film photovoltaic cell module
131 connector
14 thin-film photovoltaic cell module
141 power generation area
142 non-power generation area
15 thin-film photovoltaic cell module
151 power generation area
152 non-power generation area
152*a* through hole
21 spacer
21*a* concave portion
22 spacer
23 spacer
23*a* concave portion
3 adhesive agent
41 mounting
411 vertical beam
411*a* concave portion
412 vertical beam
42 mounting
421 vertical beam
422 panel
43 mounting
43*a* insertion groove
431 connector
44 mounting
441 column
442 column
443 vertical beam
444 support plate
444*a* water passage hole
444*b* water passage
45 rail
45*a* insertion groove
46 metal fitting
46*a* small screw hole
46*b* engaging and fixing claw
47 small screw
51 structural body
511 base portion
512 support portion
512*a* attachment surface
513 support portion
513*a* attachment surface
52 structural body
521 base portion
522 support portion
522*a* attachment surface
523 support portion
523*a* attachment surface
53 structural body
531 base portion
532 base portion
533 support portion
533*a* attachment surface
534 support portion
534*a* attachment surface
535 support portion
535*a* attachment surface
54 folded plate roof
541 peak portion
541*a* seam portion
542 valley portion
55 double sided tape
561 loop fastener 561 (surface fastener)
562 hook fastener 562 (surface fastener)
57 rivet
58 wire
61 pallet
611 mounting portion
612 standing portion
62 lifter
63 back support
64 back support
641 support block
642 support block
65 mounting
65*a* insertion groove
65*b* through hole
66 screw
67 rafter
R1 installation surface
R2 installation surface
R3 installation surface
S1 gap S2 gap
S3 gap

What is claimed is:

1. An attachment structure, comprising:

a flexible photovoltaic cell module which includes a front surface that receives light and a back surface that is opposite to the front surface, the photovoltaic cell module being disposed such that the entire back surface faces a roof surface;

a spacer inserted between a first part of the back surface of the photovoltaic cell module and the roof surface to form a gap at least partially between the back surface of the photovoltaic cell module and the roof surface, the spacer having a curved upper surface with a recess, the curved upper surface extending from one end of the spacer to one edge of the recess and then continuing from an opposite edge of the recess to another end of the spacer;

a terminal box that is attached to the back surface of the photovoltaic cell module and fitted in the recess of the spacer, and extracts electric power generated by the photovoltaic cell module;

cables connected to the terminal box; and an adhesive material, wherein the curved upper surface of the spacer is bonded directly to the first part of the back surface of the photovoltaic cell module by the adhesive material;

a lower surface of the spacer is bonded directly to the roof surface by the adhesive material; and a second part of the back surface of the photovoltaic cell module is bonded directly to the roof surface by the adhesive material.

2. The attachment structure according to claim 1, wherein the adhesive material is a foaming adhesive agent.

3. The attachment structure according tis claim 1, wherein the photovoltaic cell module is a thin-film photovoltaic cell module.

\* \* \* \* \*